United States Patent
Chin et al.

(10) Patent No.: US 10,820,750 B2
(45) Date of Patent: Nov. 3, 2020

(54) COMPUTER-CONTROLLED GRILLS

(71) Applicant: Lynx Grills, Inc., Downey, CA (US)

(72) Inventors: Hyunyup Chin, Irvine, CA (US);
James Buch, Palos Verdes Estates, CA (US); John Timothy French, Anaheim Hills, CA (US); William Chappell Pack, Palos Verdes Estates, CA (US)

(73) Assignee: LYNX GRILLS, INC., Greenwood, MS (US)

( * ) Notice: Subject to any disclaimer, the term of this patent is extended or adjusted under 35 U.S.C. 154(b) by 782 days.

(21) Appl. No.: 14/819,204

(22) Filed: Aug. 5, 2015

(65) Prior Publication Data
US 2016/0037966 A1    Feb. 11, 2016

Related U.S. Application Data

(60) Provisional application No. 62/033,604, filed on Aug. 5, 2014.

(51) Int. Cl.
*A47J 37/06*    (2006.01)
*A47J 36/32*    (2006.01)

(52) U.S. Cl.
CPC ......... *A47J 37/0682* (2013.01); *A47J 36/321* (2018.08); *A47J 37/0647* (2013.01)

(58) Field of Classification Search
CPC ...... A23L 1/01; A47J 37/0647; A47J 37/0682
See application file for complete search history.

(56) References Cited

U.S. PATENT DOCUMENTS

| 3,731,059 A | 5/1973 | Willson |
| 4,503,502 A | 3/1985 | Chapin |
| 4,823,838 A | 4/1989 | Ferlin |
| 5,018,964 A | 5/1991 | Shah |
| 5,511,535 A | 4/1996 | Landstrom et al. |
| 5,611,327 A | 3/1997 | Teixeira Filho et al. |
| 5,628,242 A * | 5/1997 | Higley ............... A47J 37/0713 126/25 R |
| 5,937,847 A * | 8/1999 | Garceau .................. F24C 3/12 126/39 H |
| 6,047,694 A | 4/2000 | Landstrom et al. |
| 6,759,635 B2 | 7/2004 | Lile |
| 6,881,055 B2 * | 4/2005 | Bird ...................... F23N 5/022 126/19 M |
| 7,227,107 B2 | 6/2007 | McLemore et al. |
| 7,808,368 B2 | 10/2010 | Ebrom et al. |

(Continued)

OTHER PUBLICATIONS

Coxworth, "CyberQ Wi-Fi lets you barbecue using your smartphone," Jun. 22, 2012, retrieved from http://www.gizmag.com/bbq-guru-cyberq-wifi/23062/.

(Continued)

*Primary Examiner* — Steven N Leff
(74) *Attorney, Agent, or Firm* — Barnes & Thornburg LLP

(57) ABSTRACT

A computer-controlled grill can operate burners based on a set of instructions in the form of a recipe. The grill can provide notifications corresponding to steps of the recipe, to alert the user to perform the steps. The notifications can be provided at the grill, through a connected mobile device, or both. The grill adjusts gas flow to one or more burners based on the recipe steps. If the grill detects that the user has not performed required steps, the grill reduces or shuts off gas flow to the burners.

10 Claims, 22 Drawing Sheets

(56) References Cited

U.S. PATENT DOCUMENTS

| | | |
|---|---|---|
| 7,813,831 B2 | 10/2010 | McCoy et al. |
| 7,908,019 B2 | 3/2011 | Ebrom et al. |
| 7,912,559 B2 | 3/2011 | McCoy et al. |
| 7,917,914 B2 | 3/2011 | McCoy et al. |
| 7,921,429 B2 | 4/2011 | McCoy et al. |
| 8,005,780 B2 | 8/2011 | McCoy et al. |
| 8,027,752 B2 | 9/2011 | Castaldo et al. |
| 8,028,302 B2 | 9/2011 | Glotzbach et al. |
| 8,193,474 B2 | 6/2012 | Harris |
| 8,218,402 B2 | 7/2012 | Lewis et al. |
| 8,312,873 B2 | 11/2012 | Gagas et al. |
| 8,345,686 B2 | 1/2013 | McCoy et al. |
| 8,359,970 B2 | 1/2013 | Calzada et al. |
| 8,395,476 B2 | 3/2013 | Ebrom et al. |
| 8,442,042 B2 | 5/2013 | McCoy |
| 8,533,253 B2 | 9/2013 | McCoy |
| 8,621,049 B2 | 12/2013 | Ebrom et al. |
| 8,730,038 B2 | 5/2014 | Durian |
| 8,786,412 B2 | 7/2014 | Ebrom et al. |
| 8,816,828 B2 | 8/2014 | Ebrom et al. |
| 8,849,430 B2 | 9/2014 | Elston, III et al. |
| 2005/0229918 A1* | 10/2005 | Shim ................. F23D 14/72 126/39 BA |
| 2006/0065263 A1* | 3/2006 | Barritt ................. F24C 7/082 126/41 R |
| 2006/0096585 A1 | 5/2006 | Dahl |
| 2006/0260603 A1 | 11/2006 | Shah |
| 2007/0045301 A1 | 3/2007 | Girish Chandra Kumar |
| 2007/0168486 A1 | 7/2007 | McCoy et al. |
| 2008/0105134 A1 | 5/2008 | Elston, III et al. |
| 2009/0132070 A1 | 5/2009 | Ebrom et al. |
| 2009/0165774 A1* | 7/2009 | Johnston ................. A47J 27/62 126/25 R |
| 2010/0132692 A1* | 6/2010 | Shaffer ............... A47J 37/0713 126/39 E |
| 2010/0211468 A1 | 8/2010 | Breunig |
| 2012/0276260 A1* | 11/2012 | Duncan ............... A47J 37/0713 426/314 |
| 2013/0061765 A1* | 3/2013 | Reinhart ............. A47J 37/0786 99/329 R |
| 2013/0133526 A1* | 5/2013 | Shealy ................ A47J 37/0623 99/325 |
| 2013/0206015 A1* | 8/2013 | Jacoby ..................... A47J 37/07 99/330 |
| 2016/0341444 A1* | 11/2016 | McMenamin ........ F24H 1/0072 |

OTHER PUBLICATIONS

Pioneering Technology, "Powergrill@—The world's first remotely controlled grill," retrieved from http://www.pioneeringtech.com/powergrill, visited Feb. 27, 2014.

* cited by examiner

COMPUTER-CONTROLLED GRILLS

CROSS-REFERENCE TO RELATED APPLICATION

This application claims the benefit of and priority to U.S. provisional patent application No. 62/033,604, entitled "COMPUTER-CONTROLLED GRILLS," filed Aug. 5, 2014, the entirety of which is hereby incorporated herein by reference.

BACKGROUND

Grills are commonly used to cook food. Grills may contain a heating element, such as a burner, and a surface on which to cook food.

SUMMARY

Some aspects of the subject technology relate to control of a grill to improve ease, quality, predictability, or repeatability of cooking, or a combination thereof. The subject technology is illustrated, for example, according to various aspects described below. Various examples of aspects of the disclosure are described as numbered clauses (1, 2, 3, etc.) for convenience. These are provided as examples, and do not limit the subject technology. It is noted that any of the dependent clauses may be combined in any combination, and placed into a respective independent clause, e.g., clause 1, 7, 8, 9, 15, 16, 17, 23, or 24. The other clauses can be presented in a similar manner.

1. A system for operating a grill, the system comprising:
   one or more processing devices; and
   one or more memory devices storing instructions that, when executed by the one or more processing devices, cause the one or more processing devices to execute the instructions, wherein the instructions comprise:
      an input module configured to receive a command to retrieve a recipe, wherein the command comprises a recipe name;
      a retrieval module configured to retrieve, from a non-transitory computer-readable medium, a recipe based on the recipe name, wherein the recipe comprises a plurality of steps, one or more step cook times, one or more grate temperatures, and one or more prompts; and
      a burner module configured to control one or more burners of the grill based on the recipe.

2. The system of clause 1 or any of the clauses, wherein the instructions further comprise:
   a presentation module configured to produce, based on the prompt, a notification of the need for external action according to a step of the recipe; and
   a confirmation module configured to receive an indication that that external action has been taken.

3. The system of clause 2 or any of the clauses, wherein the presentation module is further configured to produce the notification when the grill has attained an initial grate temperature specified by the recipe.

4. The system of clause 1 or any of the clauses, wherein the input module is configured to receive the command via an audio input.

5. The system of clause 1 or any of the clauses, wherein the input module is configured to receive the command via wireless communication with an application executed on a mobile device.

6. The system of clause 1 or any of the clauses, wherein the instructions further comprise:
   a presentation module configured to produce a notice requesting an input confirming or modifying at least one step cook time;
   a receiving module configured to receive the input;
   an update module configured to update the at least one step cook time based on the input when the input corresponds to a modification of the at least one step cook time; and
   a presentation module configured to produce a notification of the need for external action based on the updated cooking time.

7. A system for operating a grill, the system comprising:
   one or more processing devices; and
   one or more memory devices storing instructions that, when executed by the one or more processing devices, cause the one or more processing devices to execute the instructions, wherein the instructions comprise:
      a monitoring module configured to monitor a temperature of a burner of the grill;
      a burner module configured:
         upon detecting that the temperature of the burner is below a threshold temperature, (a) to instruct an increase of gas flow through a gas control valve to the burner, and (b) to activate a grill ignition associated with the burner; and
         upon detecting that the temperature of the burner of the grill remains below the threshold temperature after a predetermined period of time, to turn off gas flow into the burner and deactivate the grill ignition associated with the burner.

8. A system for operating a grill, the system comprising:
   one or more processing devices; and
   one or more memory devices storing instructions that, when executed by the one or more processing devices, cause the one or more processing devices to execute the instructions, wherein the instructions comprise:
      an input module configured to receive a command to retrieve a recipe, wherein the command comprises a recipe name;
      a retrieval module configured to retrieve, from a non-transitory computer-readable medium, a recipe based on the recipe name, wherein the recipe comprises a plurality of steps, one or more step cook times, one or more grate temperatures, and one or more prompts;
      a presentation module configured to produce a notice comprising a step of the plurality of steps, and request external action with respect to the step;
      a monitoring module configured to await an action;
      a burner module configured:
         to reduce gas flow to one or more burners thereby lowering a grate temperature of the grill when an indication that the step has been performed is not received within a first threshold period of time; and
         to terminate gas flow to the one or more burners when an indication that the step has been performed is not received within a second threshold period of time, the second threshold period of time terminating after the first threshold period of time.

9. A method for operating a grill, the method comprising:
   receiving a command to retrieve a recipe, wherein the command comprises a recipe name;
   retrieving, from a non-transitory computer-readable medium, a recipe based on the recipe name, wherein the recipe comprises a plurality of steps, one or more step cook times, one or more grate temperatures, and one or more prompts; and controlling one or more burners of the grill based on the recipe.

10. The method of clause 9 or any of the clauses, further comprising:

producing, based on the prompt, a notification of the need for external action associated with a step of the recipe; and receiving an indication that that external action has been taken.

11. The method of clause 10 or any of the clauses, wherein the notification is produced in response to determination that the grill has attained an initial grate temperature specified by the recipe.

12. The method of clause 9 or any of the clauses, wherein the receiving the command comprises receiving an audio input.

13. The method of clause 9 or any of the clauses, wherein the receiving the command comprises receiving the command via wireless communication with an application executed on a mobile device.

14. The method of clause 9 or any of the clauses, further comprising:

producing a notice requesting an input confirming or modifying at least one step cook time;

receiving the input confirming or modifying at least one step cook time;

updating the at least one step cook time based on the input when the input corresponds to a modification of the at least one step cook time; and producing a notification of the need for external action based on the updated cooking time.

15. A method for operating a grill, the method comprising:
monitoring a temperature of a burner of the grill;
detecting that the temperature of the burner is below a threshold;
upon detecting that the temperature of the burner is below a threshold temperature, (a) instructing an increase of gas flow through a gas control valve to the burner, and (b) activating a grill ignition associated with the burner; and
upon detecting that the temperature of the burner of the grill remains below the threshold temperature after a predetermined period of time, turning off gas flow into the burner and deactivating the grill ignition associated with the burner.

16. A method for operating a grill, the method comprising:
receiving a command to retrieve a recipe, wherein the command comprises a recipe name;
retrieving, from a non-transitory computer-readable medium, a recipe based on the recipe name, wherein the recipe comprises a plurality of steps, one or more step cook times, one or more grate temperatures, and one or more prompts;
producing a notice comprising a step of the plurality of steps, and request external action with respect to the step;
monitoring for receipt of an indication confirming that an action has been taken;
reducing gas flow to one or more burners thereby lowering a grate temperature of the grill when an indication confirming that an action has been taken is not received within a first threshold period of time; and
terminating gas flow to the one or more burners when an indication confirming that an action has been taken is not received within a second threshold period of time, the second threshold period of time terminating after the first threshold period of time.

17. A non-transitory machine-readable medium embodying instructions, the instructions executable by one or more processors to perform a method, the method comprising:
receiving a command to retrieve a recipe, wherein the command comprises a recipe name;
retrieving, from a non-transitory computer-readable medium, a recipe based on the recipe name, wherein the recipe comprises a plurality of steps, one or more step cook times, one or more grate temperatures, and one or more prompts; and
controlling one or more burners of the grill based on the recipe.

18. The non-transitory machine-readable medium of clause 17 or any of the clauses, wherein the method further comprises:
producing, based on the prompt, a notification of the need for external action associated with a step of the recipe; and
receiving an indication that that external action has been taken.

19. The non-transitory machine-readable medium of clause 18 or any of the clauses, wherein the notification is produced in response to determination that the grill has attained an initial grate temperature specified by the recipe.

20. The non-transitory machine-readable medium of clause 17 or any of the clauses, wherein the receiving the command comprises receiving an audio input.

21. The non-transitory machine-readable medium of clause 17 or any of the clauses, wherein the receiving the command comprises receiving the command via wireless communication with an application executed on a mobile device.

22. The non-transitory machine-readable medium of clause 17 or any of the clauses, further comprising:
producing a notice requesting an input confirming or modifying at least one step cook time;
receiving the input confirming or modifying at least one step cook time;
updating the at least one step cook time based on the input when the input corresponds to a modification of the at least one step cook time; and
producing a notification of the need for external action based on the updated cooking time.

23. A non-transitory machine-readable medium embodying instructions, the instructions executable by one or more processors to perform a method, the method comprising:
monitoring a temperature of a burner of the grill;
detecting that the temperature of the burner is below a threshold;
upon detecting that the temperature of the burner is below a threshold temperature, (a) instructing an increase of gas flow through a gas control valve to the burner, and (b) activating a grill ignition associated with the burner; and upon detecting that the temperature of the burner of the grill remains below the threshold temperature after a predetermined period of time, turning off gas flow into the burner and deactivating the grill ignition associated with the burner.

24. A non-transitory machine-readable medium embodying instructions, the instructions executable by one or more processors to perform a method, the method comprising:
receiving a command to retrieve a recipe, wherein the command comprises a recipe name;

retrieving, from a non-transitory computer-readable medium, a recipe based on the recipe name, wherein the recipe comprises a plurality of steps, one or more step cook times, one or more grate temperatures, and one or more prompts;

producing a notice comprising a step of the plurality of steps, and request external action with respect to the step;

monitoring for receipt of an indication confirming that an action has been taken;

reducing gas flow to one or more burners thereby lowering a grate temperature of the grill when an indication confirming that an action has been taken is not received within a first threshold period of time; and terminating gas flow to the one or more burners when an indication confirming that an action has been taken is not received within a second threshold period of time, the second threshold period of time terminating after the first threshold period of time.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding and are incorporated in and constitute a part of this specification, illustrate aspects of the subject technology and together with the description serve to explain principles of the subject technology. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Figure 1A:
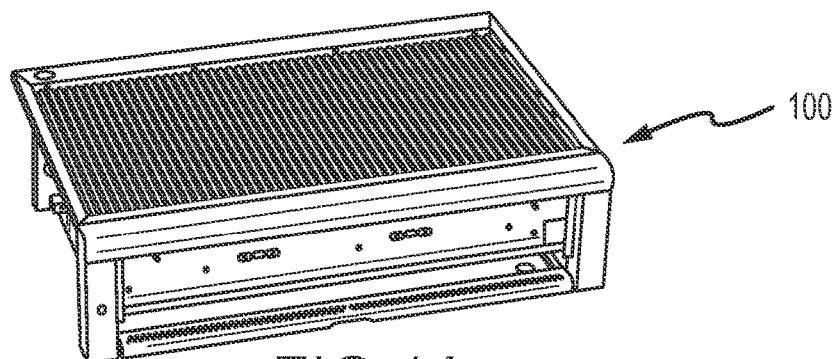
FIG. 1A is a perspective view of a grill 100, according to aspects of the present disclosure, with all cooking grates in place.

FIG. 1A illustrates a grill 100 according to an aspect of the present disclosure.

Figure 1B:
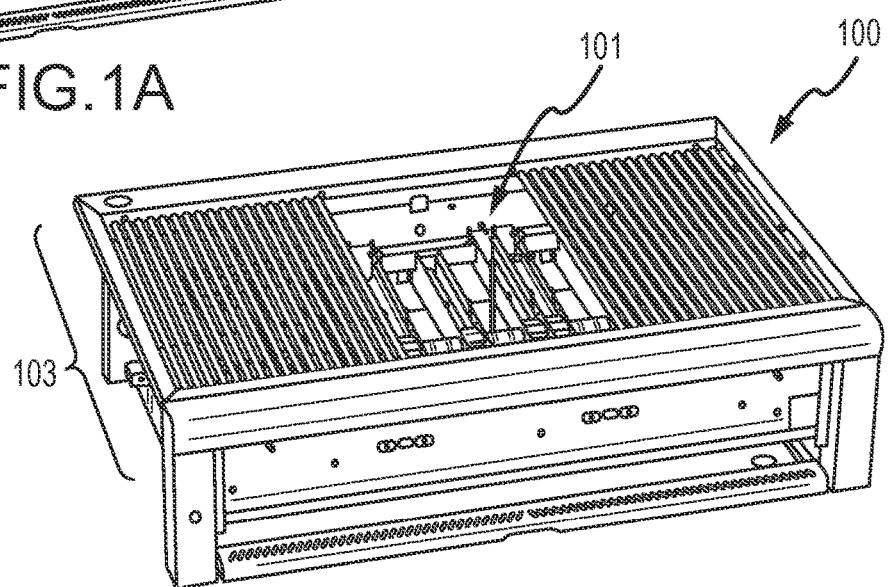
FIG. 1B illustrates the grill 100 of FIG. 1A with the center cooking grate removed.

FIG. 1B illustrates the grill 100 with the center grill grate removed in order to show components located underneath the center grill grate. Gas flows to the burner 101 and is ignited to generate a flame. The flame cooks food that is placed above it, on top of grate 103. The grill 100 illustrated in FIG. 1A has a grate in three sections with a burner located beneath each section of the grate. However, in some aspects of the subject technology, the grill 100 can have other numbers of burners and grate sections, and the number of grate sections can be the same as, greater than, or less than the number of burners. Burners of types other than those illustrated can be employed in some aspects of the subject technology. Further, various combinations of types of burners can be employed in the same grill in some aspects of the subject technology.

Figure 1C:
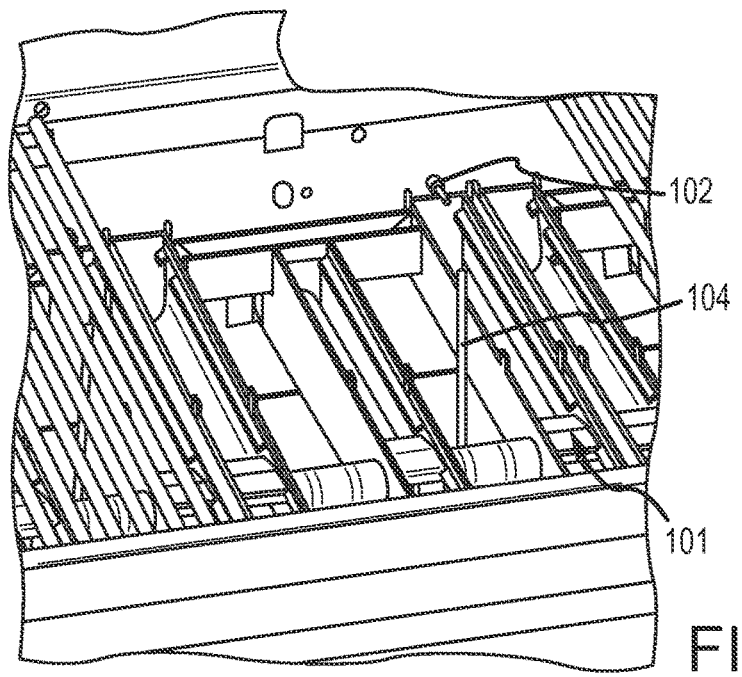
FIG. 1C illustrates a close-up view of components located underneath the center grill grate in a portion of FIG. 1B.

FIG. 1C illustrates a close-up view of some components located underneath the center grill grate. Burner temperature probe 102 can be positioned in, at, or near a burner 101. For example, a temperature sensing region of the burner probe can be positioned proximate a surface whether gas and/or flame escapes the burner 101, e.g., through orifices and/or pore in an upper surface of the burner. The temperature sensing region can be at terminal end portion of the burner temperature probe, and can be positioned within (e.g., above) about 3 cm, 2 cm, 1 cm, or 0.5 cm of the surface where gas and/or flame escapes the burner 101. In some implementations, the temperature sensing region can be located near the front or rear of the grill, or at a position near an end or between ends of the burner (e.g., near a center of the burner). The burner temperature probe 102 senses and/or measures the temperature at the burner 101 of the gas grill and provides a signal indicative of the temperature at the burner. In some embodiments wherein the grill comprises one or more burner temperature probes, the signal(s) output by burner temperature probe(s) positioned in, at, or near different burners can be used to determine whether the corresponding burner(s) 101 have been ignited. In some embodiments wherein the grill comprises multiple burners, a burner temperature probe can be positioned proximate a surface where the gas and/or flame escapes each burner 101.

Grate temperature probe 104 can be positioned in, at, or near a grate 103. For example, a temperature sensing region of the grate probe can be positioned proximate a cooking surface, e.g., an upper surface of the grate. The temperature sensing region can be at terminal end portion of the grate temperature probe, and can be positioned within (e.g., below) about 3 cm, 2 cm, 1 cm, or 0.5 cm of the cooking surface. The grate temperature probe 104 senses and/or measures the temperature at the grate 103 and provides a signal indicative of the temperature at the grate. In some embodiments wherein the grill comprises one or more grate temperature probes, the grate temperature probes can be positioned at different regions or sections of the grate, and can be positioned above different burners.

Figure 1D:
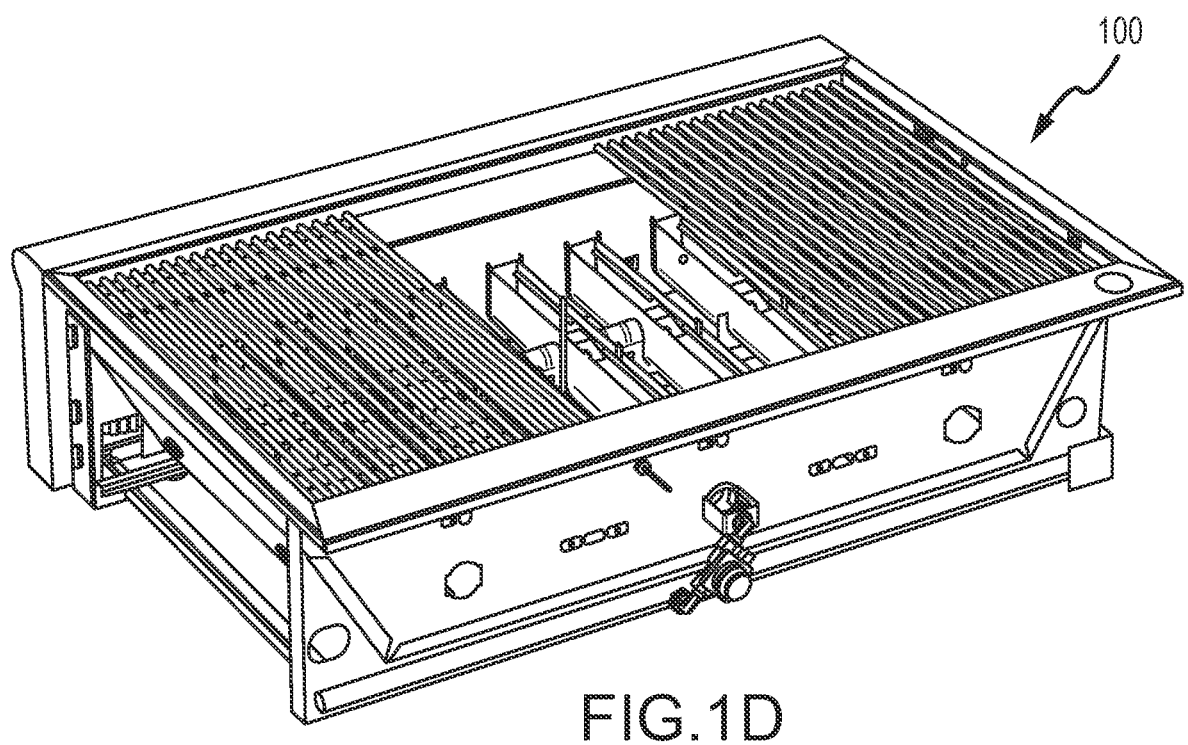
FIG. 1D illustrates a rear view of the grill of FIG. 1A according to aspects of the present disclosure, with the center grill grate removed.
Figure 1E:
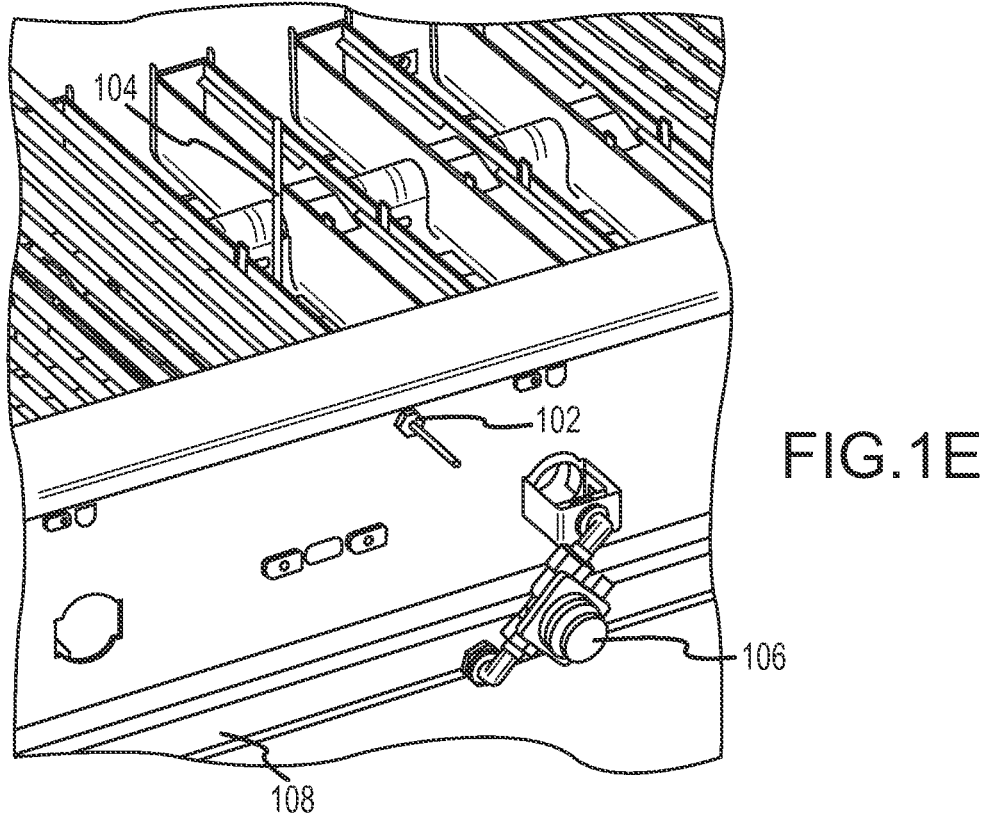
FIG. 1E illustrates a close-up view of a portion of the rear view of the grill in FIG. 1D.

FIG. 1D illustrates a rear view of the grill 100 with the center grill grate removed. FIG. 1E illustrates a close-up view of a portion of the rear view of the grill 100 of FIG. 1D. A control valve 106 adjusts the amount of gas flowing into the burner 101 from the gas manifold 108.

FIG. 1E also shows the burner temperature probe 102 and the grate temperature probe 104. The burner temperature probe 102 is illustrated projecting rearwardly at a rear side of a grill. In some implementations, burner temperature probes 102 can extend through a firebox of the grill at front, right, left, or rear sides of the firebox, or a combination thereof.

Figure 1F:
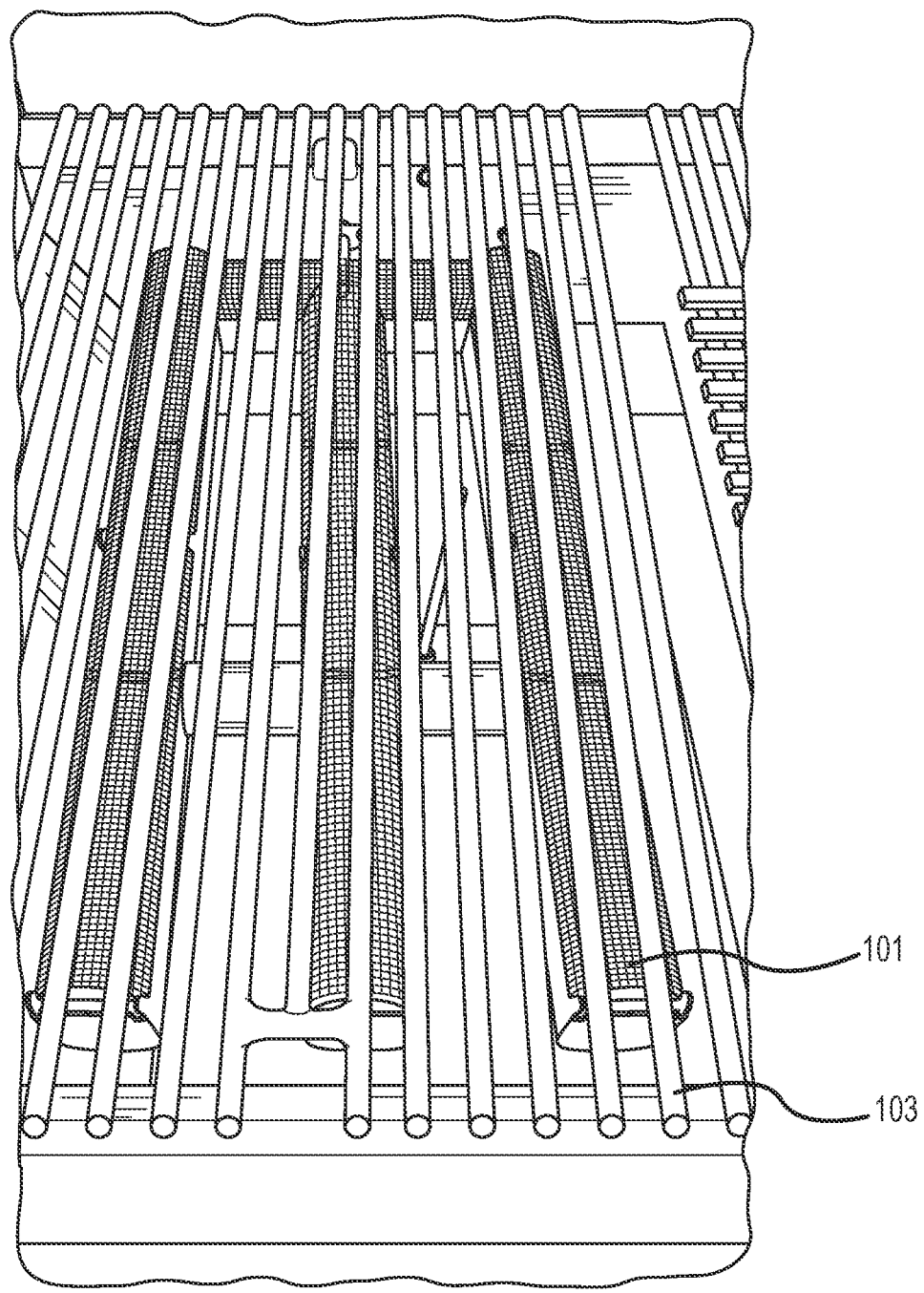
FIG. 1F is a close-up view of the center grill grate and the burner of FIG. 1A according to aspects of the present disclosure.
Figure 1G:
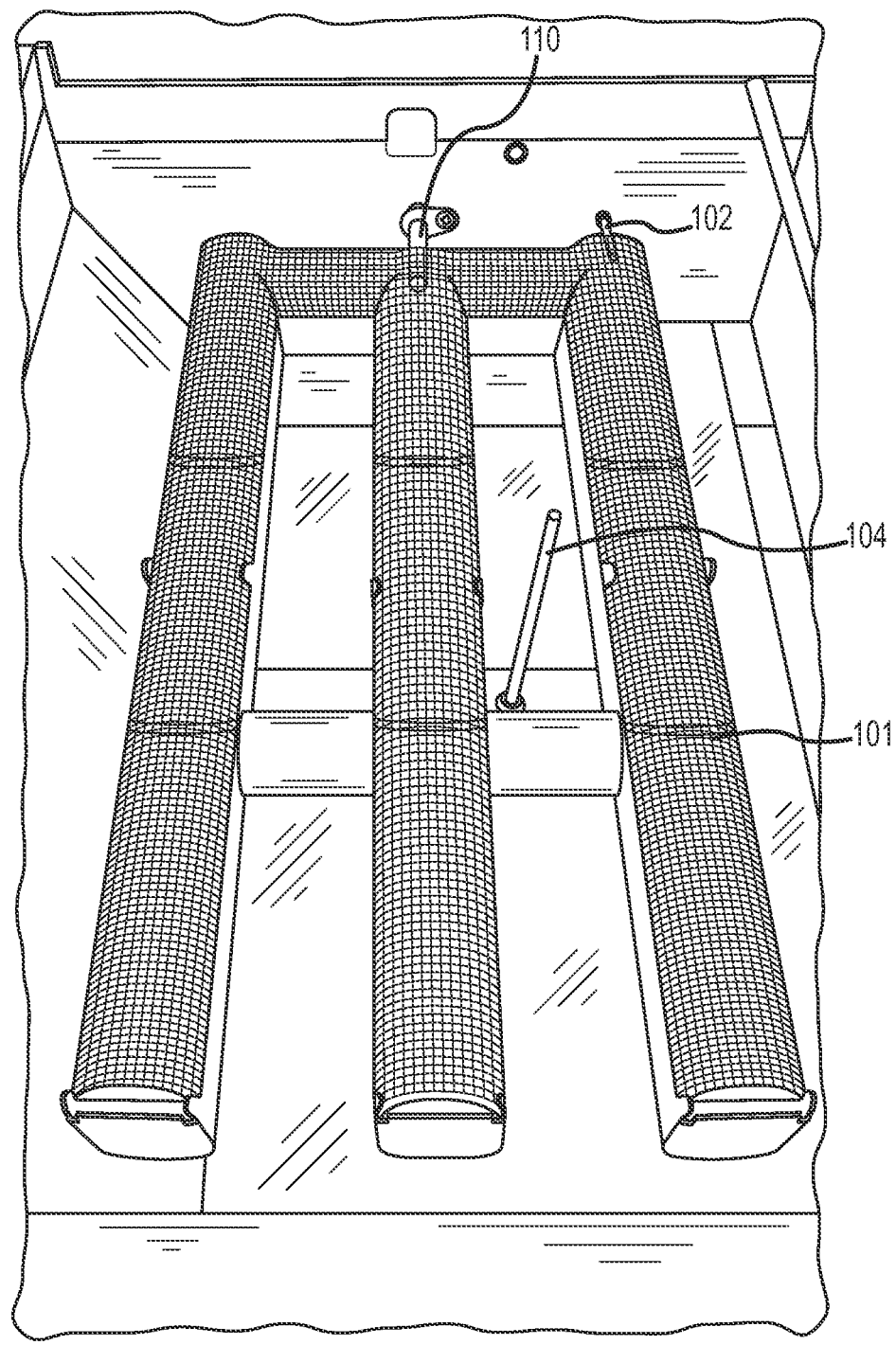
FIG. 1G is a view of the center burner of the grill of FIG. 1A according to aspects of the present disclosure, with the grill grate removed.

FIG. 1F is a close-up view of the grill grate 103 and the burner 101. FIG. 1G is a close-up view of the grill 100, as in FIG. 1F, and shows the grill grate 103 removed. A burner igniter 110 extends into the burner, and is configured to ignite gas flowing into the burner 101 to create a flame. Although FIGS. 1A-1G show the grill 100 comprising the burner 101, in other implementations the grill 100 may comprise other types of burners, such as a rotisserie burner.

Figure 1H:
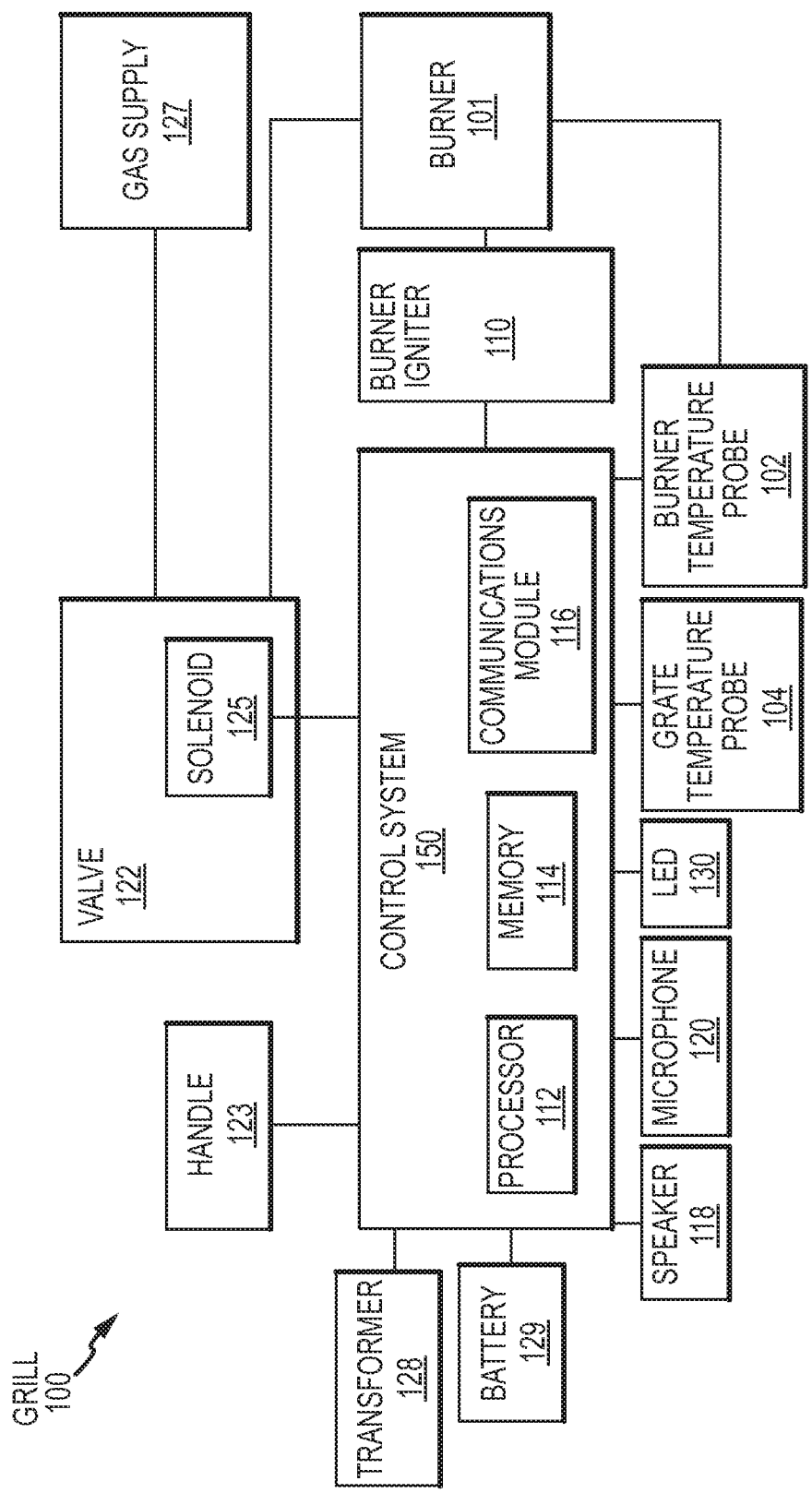
FIG. 1H illustrates components of the grill of FIG. 1A according to aspects of the present disclosure.

FIG. 1H illustrates schematically various components of the grill 100 of FIG. 1A. The grill 100 comprises a control system 150 comprising a processor 112, a memory 114, and a communications module 116. The illustrated grill 100 comprises a speaker 118, a microphone 120, an LED 130, the burner temperature probe 102, and the grate temperature probe 104, each of which is operatively, e.g., electrically, coupled to the control system 150. As illustrated in FIG. 1H, the grill 100 can comprise a valve 122 (such as valve 106 illustrated in FIG. 1E), the burner igniter 110, a gas supply 127, the burner 101, a transformer 128, and a battery 129, according to example aspects. The gas supply 127 can comprise a source of combustible gas, such as, for example, a tank or continuous flow system. The grill 100 can comprise a single valve 122 for a single burner 101, or can comprise multiple valves 122 for respective multiple burners 101, each valve being independently controllable and each burner and igniter being independently controllable. For example, although FIG. 1C shows three burners 101, the grill 100 can comprise additional or fewer burners 101. In some embodiments comprising multiple burners, the grill can comprise a valve, an igniter, a burner temperature probe, a grate temperature probe, or any combination thereof for each burner.

The valve 122 is connected to the gas supply 127. The valve 122 allows gas from the gas supply 127 to flow through the valve when it is open, and prevents gas from flowing through the valve when it is closed. The solenoid 125 can comprise an electromagnet that pulls and holds open the valve 122 based on an applied current.

As illustrated in FIG. 1H, the valve 122 can comprise a handle 123 (e.g., a knob). However, in some implementations a handle 123 used to control a valve can be located at a location remote from the valve. For example, a handle 123 can be located at a front or side panel of a grill while the valve is located at a back panel, as illustrated in FIG. 1E, for example. In some implementations, the valve may be located elsewhere, such as near a front panel, a side panel, as needed or desired, for the associated burners.

The processor 112 may be one or more processors. Processor 112 may be a general-purpose microprocessor, a microcontroller, a Digital Signal Processor (DSP), an Application Specific Integrated Circuit (ASIC), a system-on-a-chip (SoC), a Field Programmable Gate Array (FPGA), a Programmable Logic Device (PLD), a controller, a state machine, gated logic, discrete hardware components, or any other suitable entity that can perform calculations or other manipulations of information.

The memory 114 can comprise, for example, Random Access Memory (RAM), flash memory, Read Only Memory (ROM), Programmable Read-Only Memory (PROM), Erasable PROM (EPROM), registers, a hard disk, a removable disk, a CD-ROM, a DVD, or any other suitable storage device, coupled to a bus for storing information and instructions to be executed by processor 112. The processor 112 and the memory 114 can be supplemented by, or incorporated in, special purpose logic circuitry.

The communications module 116 is configured to interface with a network to send and receive information, such as data, requests, responses, and commands to the grill 100 and other devices on the network. The communications module 116 can comprise a wireless network adapter, a WiFi adapter, Bluetooth adapter, or a cellular radio adapter, for example. Alternatively or in addition to wireless communications, the communications module 116 may be configured for wired communications. The communications module 116 can comprise a wired local area network (LAN) connection, such as an Ethernet adapter, for example. The communications module 116 may be used to communicate between the grill 100 and a mobile device 500 (see, e.g., FIG. 2B) or other computing device, for interfacing with the user. The communications module may be peer to peer (e.g., devices use Bluetooth and all logic/recipes is stored on devices, devices use WiFi Direct and all logic/recipes is stored on devices), local network (e.g., WiFi for communication, logic/recipes are stored locally, or logic/recipes are stored on devices which communicate through WiFi), and server-based (e.g., logic/recipes can be on server, or split amongst devices).

Figure 1I:
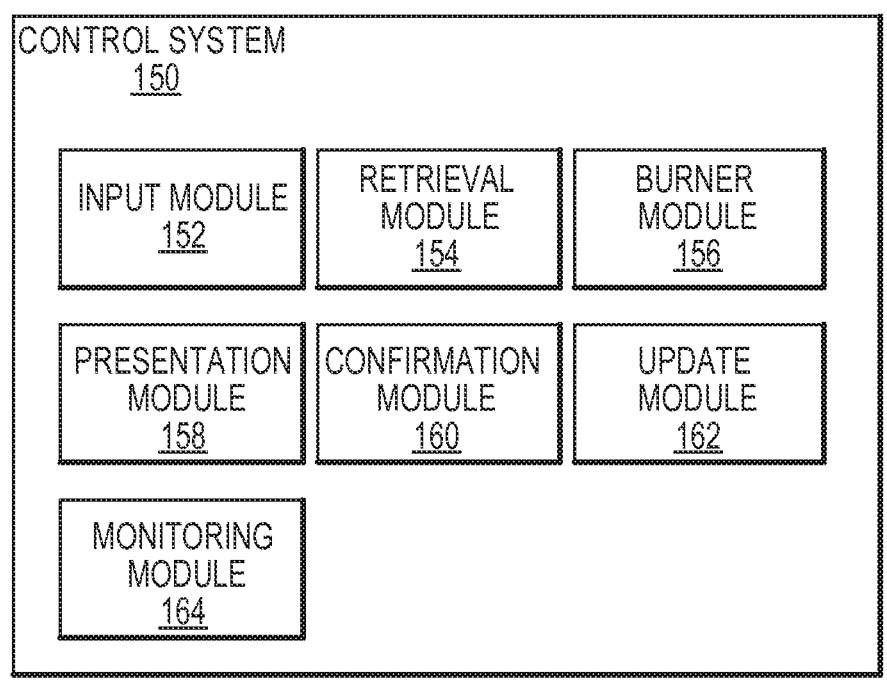
FIG. 1I illustrates components of a control system of the grill of FIG. 1A according to aspects of the present disclosure.

FIG. 1I is a conceptual diagram of the control system 150. The control system 150 may be implemented with the processor 112, or may be a separate processor and/or control circuit communicatively coupled to the processor 112. Control system includes an input module 152 configured to receive a command to retrieve a recipe, a retrieval module 154 configured to retrieve, from a non-transitory computer-readable medium, a recipe based on the recipe name, a burner module 156 configured to control one or more burners of the grill based on the recipe, a presentation module 158 configured to produce a notification of the need for external action, a confirmation module 160 configured to receive an indication that that external action has been taken, an update module 162 configured to update the at least one step cook time based on the input when the input corresponds to a modification of the at least one step cook time, and a monitoring module 164 configured to monitor a temperature of a burner of the grill.

Figure 2A:
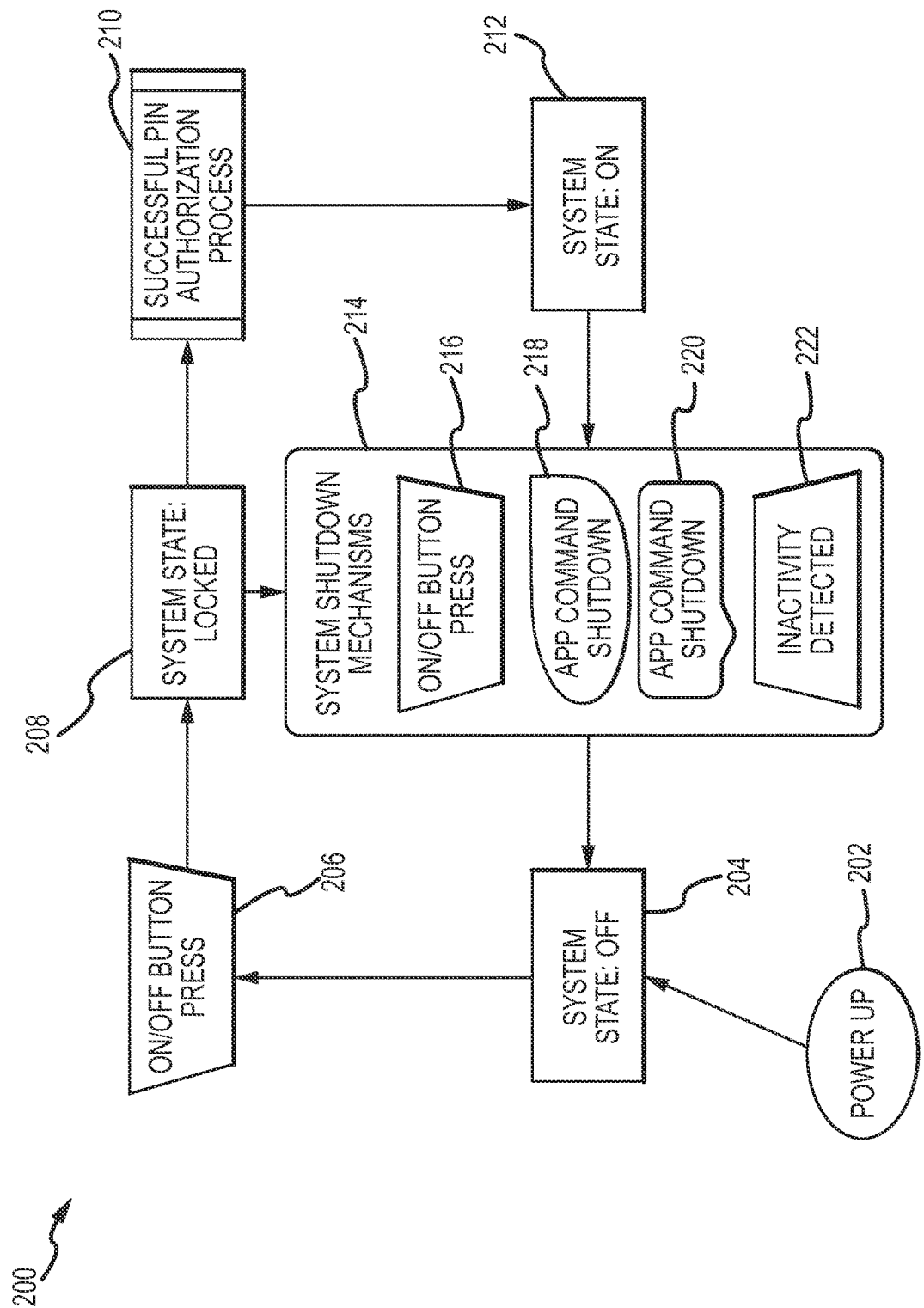
FIG. 2A is an example process for controlling the grill according to aspects of the present disclosure.

FIG. 2A is an example process 200 for controlling the grill 100. The grill 100 is powered up (202). In some aspects, the grill 100 is inoperable in this merely powered up state. For example, the grill 100 may be powered up when it is plugged in to a power source. Upon powering up, the grill state may be OFF (204). In some aspects, the grill remains inoperable. The grill 100 is turned on by activation of an on/off button on the grill 100, e.g., at a front or side panel of the grill, (206). In certain implementations, the grill 100 may be turned on by a voice command received via microphone 120, in addition or alternative to actuating an on/off button, e.g., a button on the grill. Upon turning on, the grill 100 may enter a LOCKED state. In this LOCKED state, grill 100 remains inoperable.

A personal identification number (PIN) authorization (210) can be required in some embodiments of the subject technology. A PIN entry can be implemented for safety purposes. The control system 150 can verify the PIN for authorization. In some aspects, the PIN is authorized once when the grill 100 is initially set up, and thereafter, e.g., until a system or PIN reset, the control system of the grill can bypass the LOCKED state when the grill is turned on and proceed directly to a system ON state. In some aspects, the PIN is authorized each time a user turns on the grill 100. The control system 150 can verify or authorize the PIN over a network or locally, by comparing the entered PIN to a previously established, stored value. The PIN can be entered by the user by pressing buttons on the mobile device 500 or on the grill, if present at such location(s).

Figure 2B:
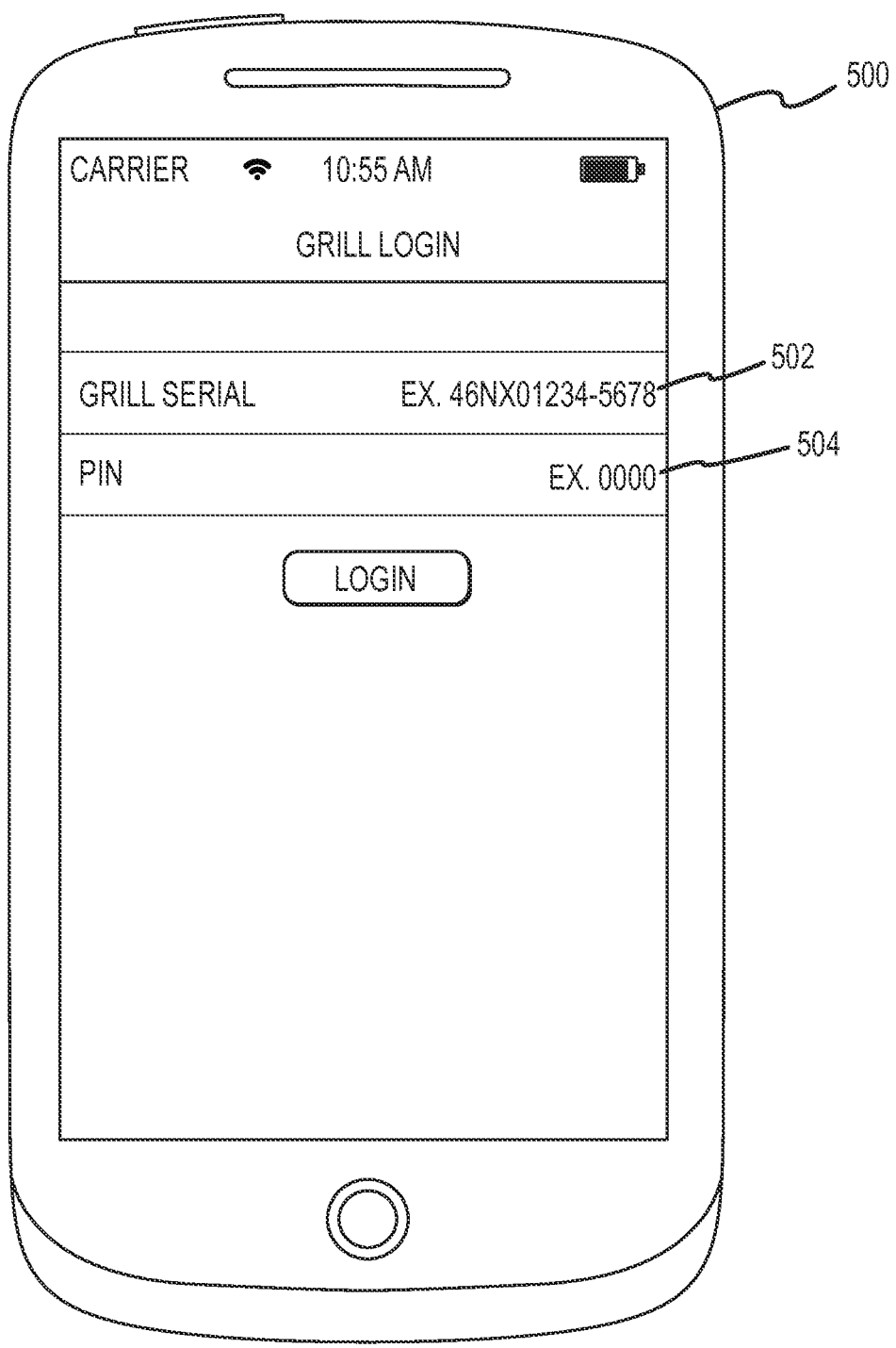
FIG. 2B illustrates an example interface of entry of a serial number and PIN according to aspects of the present disclosure.

FIG. 2B illustrates an example interface of entry of a serial number and PIN. Mobile device 500 displays a grill serial number field 502 and PIN field 504. The mobile device can comprise one or more processors, a memory, a display, an input device, and a communications device. A serial number can be required to verify the particular grill 100 that will be used in conjunction with the mobile device 500. Mobile device 500 is configured to connect to the grill 100 over a network, for example the mobile device can comprise a wireless network adapter, a WiFi adapter, Bluetooth adapter, or a cellular radio adapter. A user of the mobile device 500 can enter the serial number of the grill 100 into the serial number field 502 and a PIN into the PIN field 504 to authenticate the user's use of the grill 100. The PIN and serial number can be verified and/or authenticated by and among the mobile device, the control system 150, a server, or combination thereof.

Figure 2C:
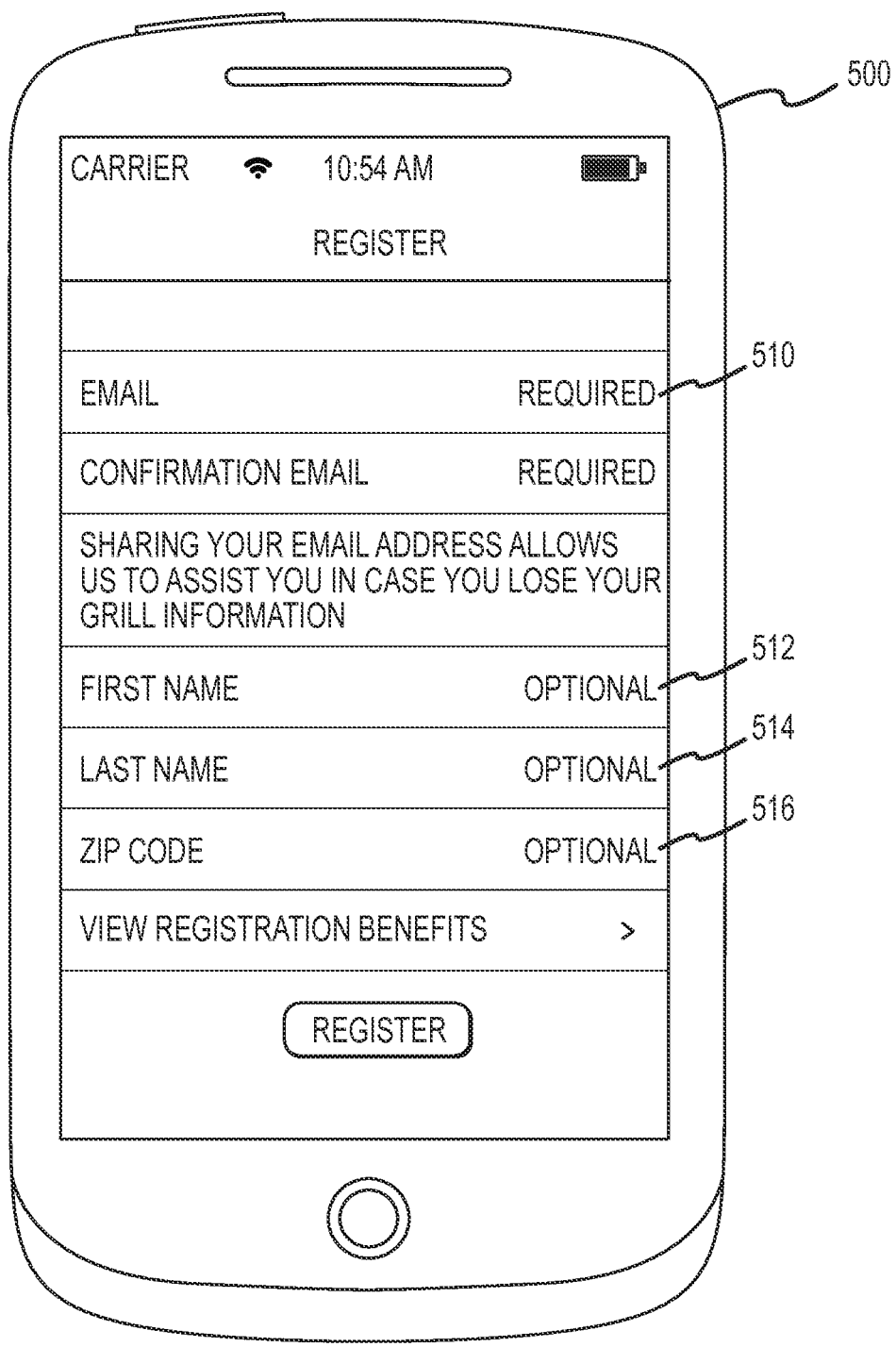
FIG. 2C illustrates an example interface of entry of registration information according to aspects of the present disclosure.

FIG. 2C illustrates an example interface of entry of registration information from a user. Registration information may include an email address, a first name, a last name, and a zip code.

Referring back to FIG. 2A, upon successful authorization of the PIN, the grill state is ON (212). The control system 150 can change the grill state to ON upon successful authorization of the PIN. The grill 100 can be shut down either during the LOCKED state or during the ON state (214). The grill 100 can be shut down by pressing the on/off button (216), by a command from an application running on a mobile device 218, by a voice command from a user received using the microphone 120 (220), or by detecting a period of inactivity of the grill 100 (222). When the grill 100 is shut down, the control system can change the system state from ON to OFF.

Figure 3A:
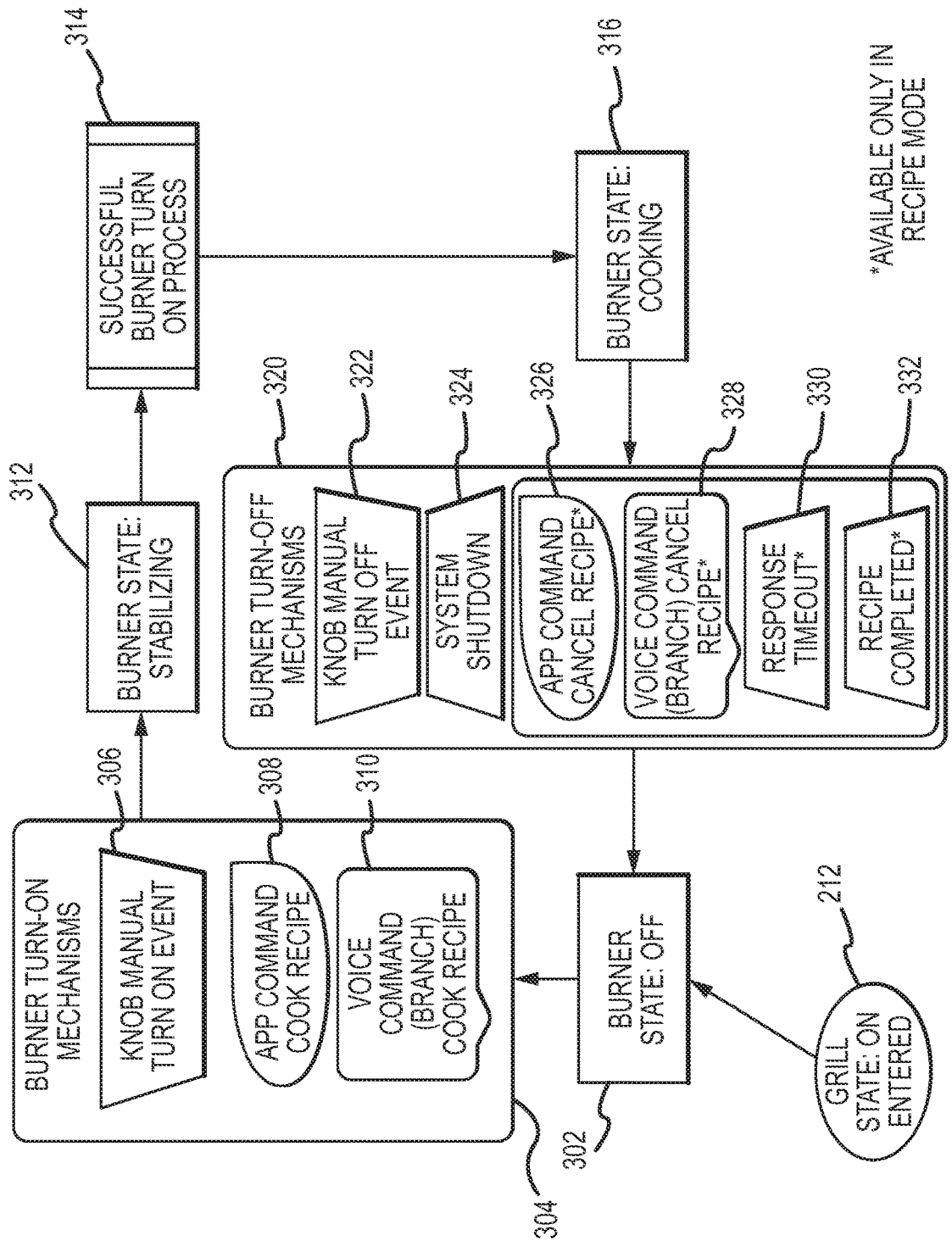
FIG. 3A is an example process for controlling burners according to aspects of the present disclosure.

FIG. 3A is an example process for controlling burners 101. While the grill state is ON (212), a burner state can be OFF (302). The burners 101 can be turned on in any number of ways (304) in some implementations of the subject technology. The burners 101 can be turned on manually (306). In some aspects, manually turning a handle 123 (FIG. 1H), which can be or have a knob, on the grill 100 turns on the burners 101. For example, the control system 150 can receive a signal from a sensor at the handle 123 indicative of a position of the handle, and can send a signal to the valve 122 to open or close the valve based on the signal received from the handle sensor. The burners 101 can be turned on in response to a signal received from a mobile device executing a recipe (308). The burners 101 can be turned on in response to a voice command received via microphone 120 (310).

After a burner turn-on input, such as a signal, is received, the burner state is STABILIZING (312). In this state, the burner igniter 110 and gas flow from the gas manifold 108 are orchestrated to ignite and stabilize the burners 101 prior to giving control back to the user for manual or recipe cooking.

Upon successfully turning on the burners 101 (314), the burner state is COOKING (316). The burners 101 can be turned off in any number of ways (320). A handle, e.g, a knob, can be manually turned to an off position (322), a system shutdown signal is received (324), an application command to cancel the recipe is received from a mobile device 500 (326), a voice command is received via microphone 120 to cancel a recipe (328), a response timeout can occur (330), or a recipe can be completed (332).

The grill 100 can be operated in a manual mode or recipe mode. Operating the grill 100 in a manual mode results in use of the grill in a manner similar to a normal gas grill. Turning the knobs adjusts the gas flow into the burners 101, thereby adjusting the intensity of the flame and adjusting the temperature at the grill grate 103.

Figure 3B:
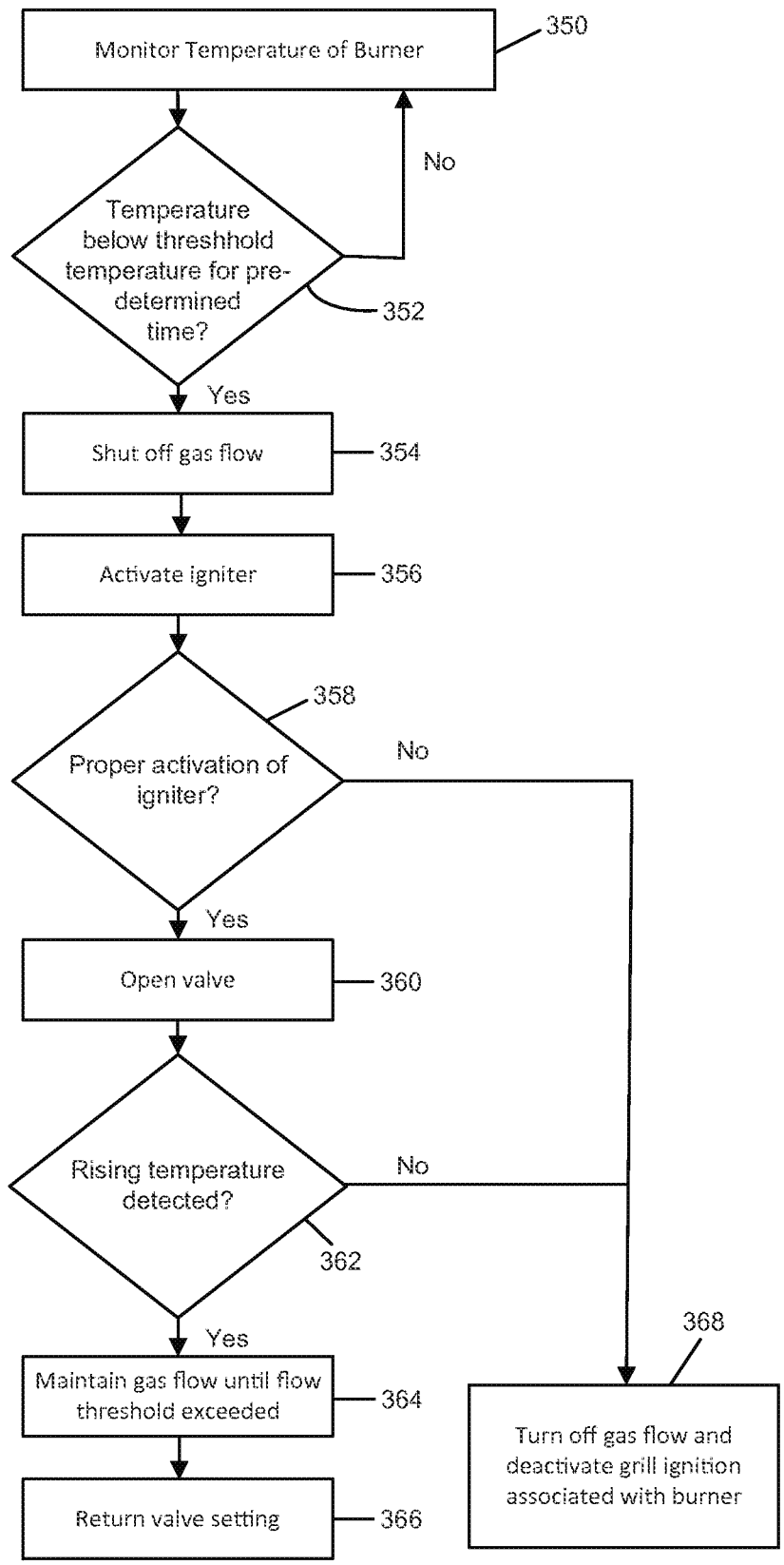
FIG. 3B is an example process for reigniting a burner according to aspects of the present disclosure.

FIG. 3B illustrates example processes for igniting and reigniting a burner, such as one or more of the burners 101. Although FIG. 3B will be described with respect to a single burner, more than one burner can be controlled together simultaneously, and/or one or more burners can be selectively independently controlled. A temperature of a burner is monitored (350). The burner temperature can be monitored while the burner is in an ON state only, a STABILIZING state only, both ON and STABILIZING states only, or whenever the grill is in an ON state. For example, the control system 150 can monitor a temperature of the burner 101 using the burner temperature probe 102. The control system 150 can continuously or repeatedly determine a temperature of the burner 101 based on a signal received from the corresponding burner temperature probe 102.

If the burner state is ON and the burner temperature is below a threshold temperature for a predetermined time (352), gas flow to the burner is shut off (354). The control system 150 can instruct the gas flow from the gas supply 127 to the burner 101 to be shut off if, for example, the burner temperature is below the threshold temperature for 10 seconds or other predetermined time. The control system 150 can shut off the valve 122 by sending a signal to close the solenoid 125, or by ceasing to send a signal to keep the solenoid open. In some implementations, the control system 150 can save in memory 114 an indicator indicative of a condition of the valve's openness, e.g., a valve opening setting, prior to closing the valve 122. If the burner temperature is not below the threshold temperature for the predetermined time, the control system 150 continues to monitor the burner temperature (350). The predetermined temperature can be a static temperature value applied for any target operating temperature of a burner, or can be a dynamic value determined as a differential value compared to a target operating temperature of a burner. For example, the predetermined value can be a value determined during operation of the grill when a target temperature is set for a burner. As a further example, the predetermined value can be an amount, e.g., 50 degrees, less than the target temperature.

After the gas flow is shut off (354), a grill ignition sequence associated with the burner is activated. The grill ignition sequence can be performed as an initial ignition of a burner from a cold condition, such as following the turning on of the grill 100, or as a reignition after the gas flow is shut off while the grill remains on since termination of the burner's preceding ON state. The control system 150 can send an ignition signal to the burner igniter 110 (FIG. 1H) (356). The grill ignition sequence can comprise checking for a current received from the burner igniter 110 (358), opening a gas valve after receipt of the igniter current is confirmed (360), and monitoring for a rise in burner temperature (362). The control system 150 can perform some or all of the grill ignition sequence for the burner 101. The grill ignition sequence can be similar for all burners 101 in any mode for the grill 100.

If proper activation of the igniter is not detected, e.g., because no or insufficient current is received by the control system 150 from the burner igniter 110, gas flow is shut off and the grill ignition sequence for the associated burner is deactivated or aborted (368).

If the igniter was properly activated (358), the valve 122 is opened (360). The control system 150 can send a signal to the solenoid 125 to open the valve 122 to 100%.

After the valve is opened (360), whether a temperature of the burner is rising is detected (362). The control system 150 monitors the burner temperature of the burner 101 with the burner temperature probe 102 to determine a rising temperature. For example, the control system 150 can monitor a signal received from the burner temperature probe for an increase in temperature by a threshold amount, a rate of temperature increase, or a continuous increase in temperature for a threshold period of time, or a combination thereof. If temperature is detected not to rise by the threshold amount, gas flow is shut off and the grill ignition sequence for the associated burner is deactivated or aborted (368). The control system 150 can detect that the burner temperature is not rising or rising insufficiently, and accordingly stop the ignition sequence.

If the rising temperature is detected (362), gas flow is maintained until a low temperature threshold is exceeded (364). The control system 150 can keep the valve 122 open to 100% until the low temperature threshold is exceeded.

Once the low temperature threshold is exceeded, the valve setting is returned (366). The control system 150 can restore the valve 122 to the previously saved indicator of the valve's openness from the memory 114.

Figure 4A:
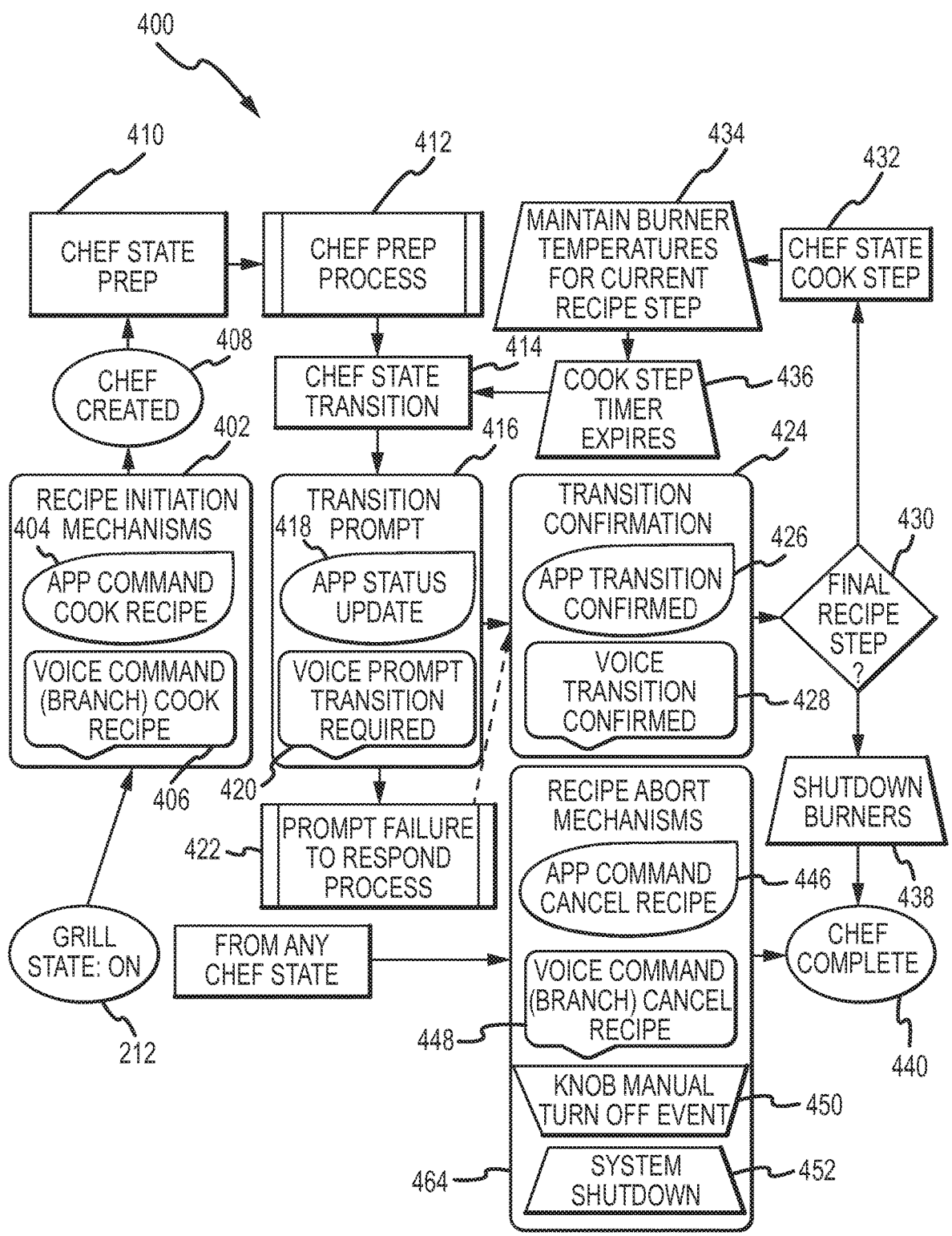
FIG. 4A is an example process for executing a recipe using the grill according to aspects of the present disclosure.

FIG. 4A is an example process 400 for executing a recipe using grill 100. This process can be executed by the control system 150, and instructions for this process can be stored in the memory 114. While the grill state is ON (212), a recipe can be initiated (402). The recipe can be initiated by receiving a command from an application operating on a mobile device 500 (404). The recipe can be initiated by receiving a voice command given by a user via the microphone 120 (406). For example, a user can say "<GrillName>, Cook <RecipeName>." The voice command can be parsed to determine the RecipeName, so that the recipe can be retrieved. Recipes can be stored locally in memory 114 or in memory of the mobile device 500, or stored remotely (e.g., on a server) and accessible via a network, for example. Recipes can be pre-loaded onto the grill 100, mobile device 500, or can be created by a user. The user can create a recipe, for example, from scratch or by modifying an existing recipe. For example, the user may create or modify a recipe on the mobile device 500, and send directly to the grill 100 or otherwise make available to the grill 100 (e.g. by storing the recipe remotely and having the grill 100 access the remotely stored recipe) for execution by the grill 100. In addition, the user may create or modify a recipe on the grill 100.

The user can also share the new recipe with a second user, who can use the recipe on the second user's respective computer-controlled grill. Sharing of recipes can be executed directly from one computing device to another computing device, from one grill to another grill, or any combination thereof. A user can share his/her created recipe by storing it on a server for the second user to download using a computing device or his/her respective grill.

Figure 4B:
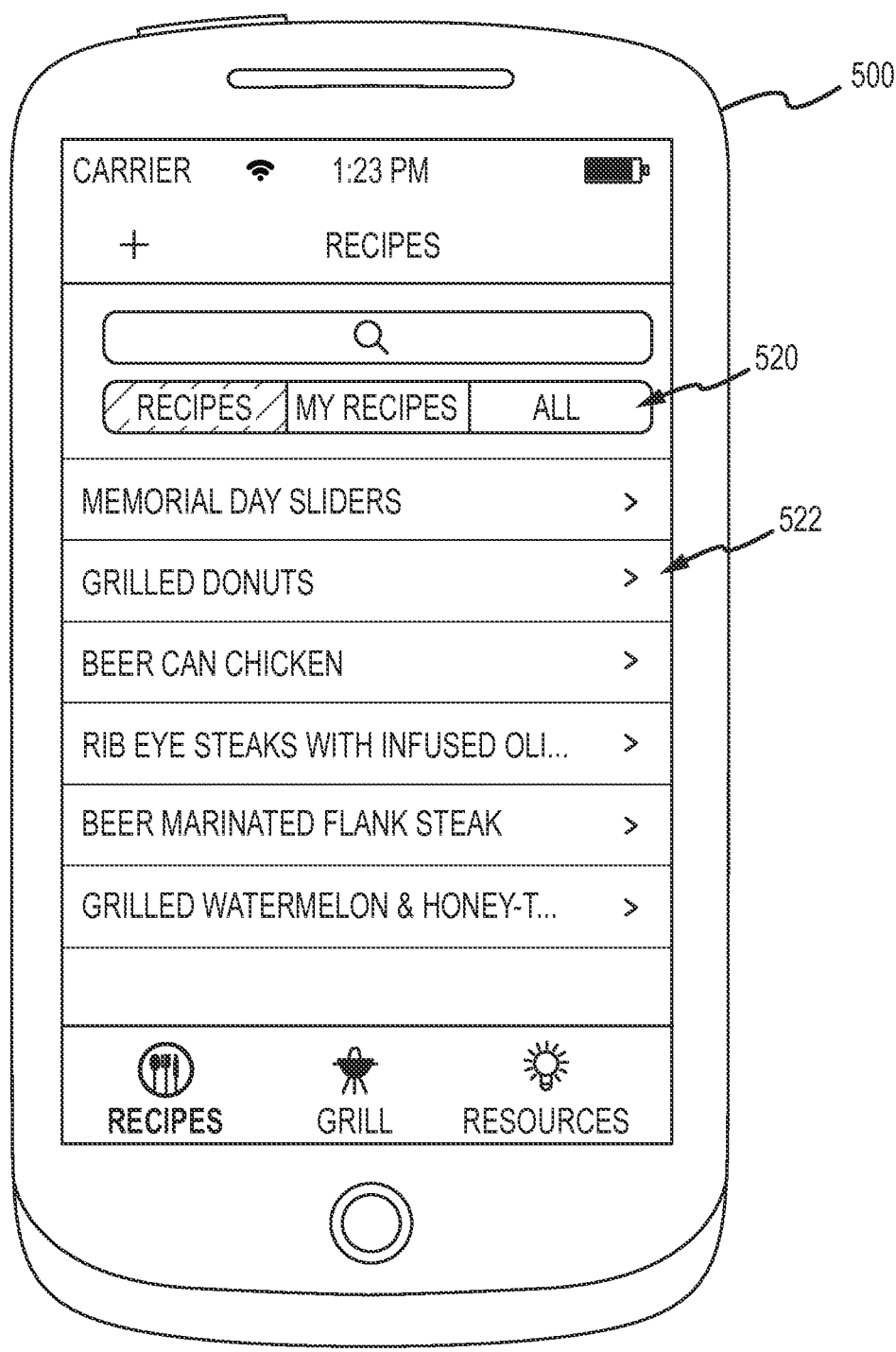
FIG. 4B illustrates an example interface of an application operating on a mobile device according to aspects of the present disclosure.

FIG. 4B illustrates an example interface of an application operating on a mobile device 500. The application can store and display recipes, and organize them into one or more categories 520. The recipe names 522 can be displayed for selection by the user.

Figure 4C:
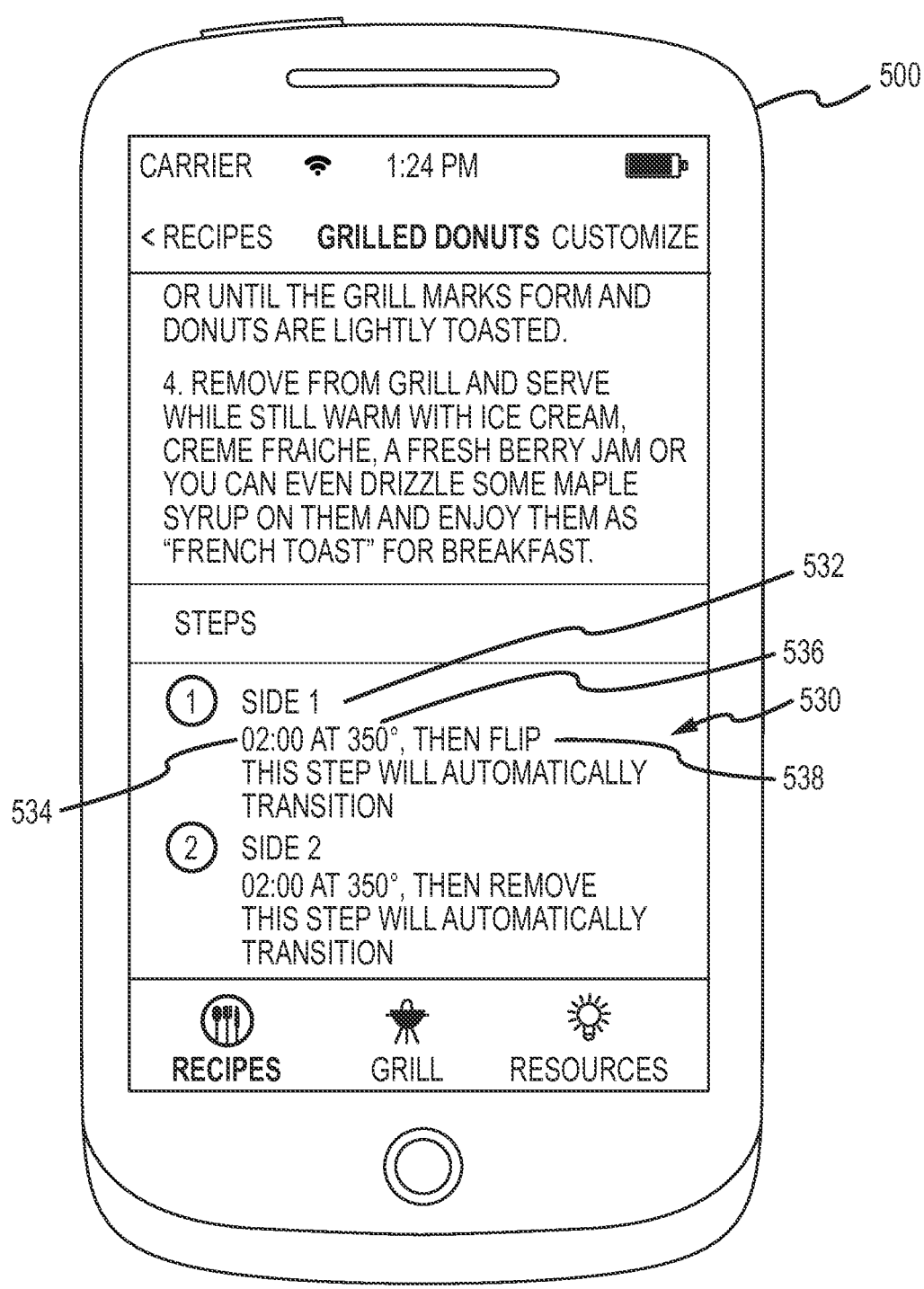
FIG. 4C illustrates an example interface for displaying steps of a recipe on a mobile device according to aspects of the present disclosure.

FIG. 4C illustrates an example interface for displaying steps of a recipe on a mobile device 500. In this example, the first step (Step 1) 530 has a step name (Side 1) 532, a cook time (02:00) 534, a cook temperature (350 degrees) 536 and a transition (Flip) 538. That is, the first step indicates that the first side of a food item should be placed on the grate 103 for two minutes. The control system 150 of the grill 100 will control the valve 122 such that a temperature of the burner 101 of at the grate region associated with (e.g., above) the burner is at 350 degrees, e.g., within a range of temperatures including the target temperature of 350 degrees. After the two minutes has elapsed, the transition indicates that the food item should be flipped. Once the transition has been accomplished, the next step should be executed.

Figure 4D:
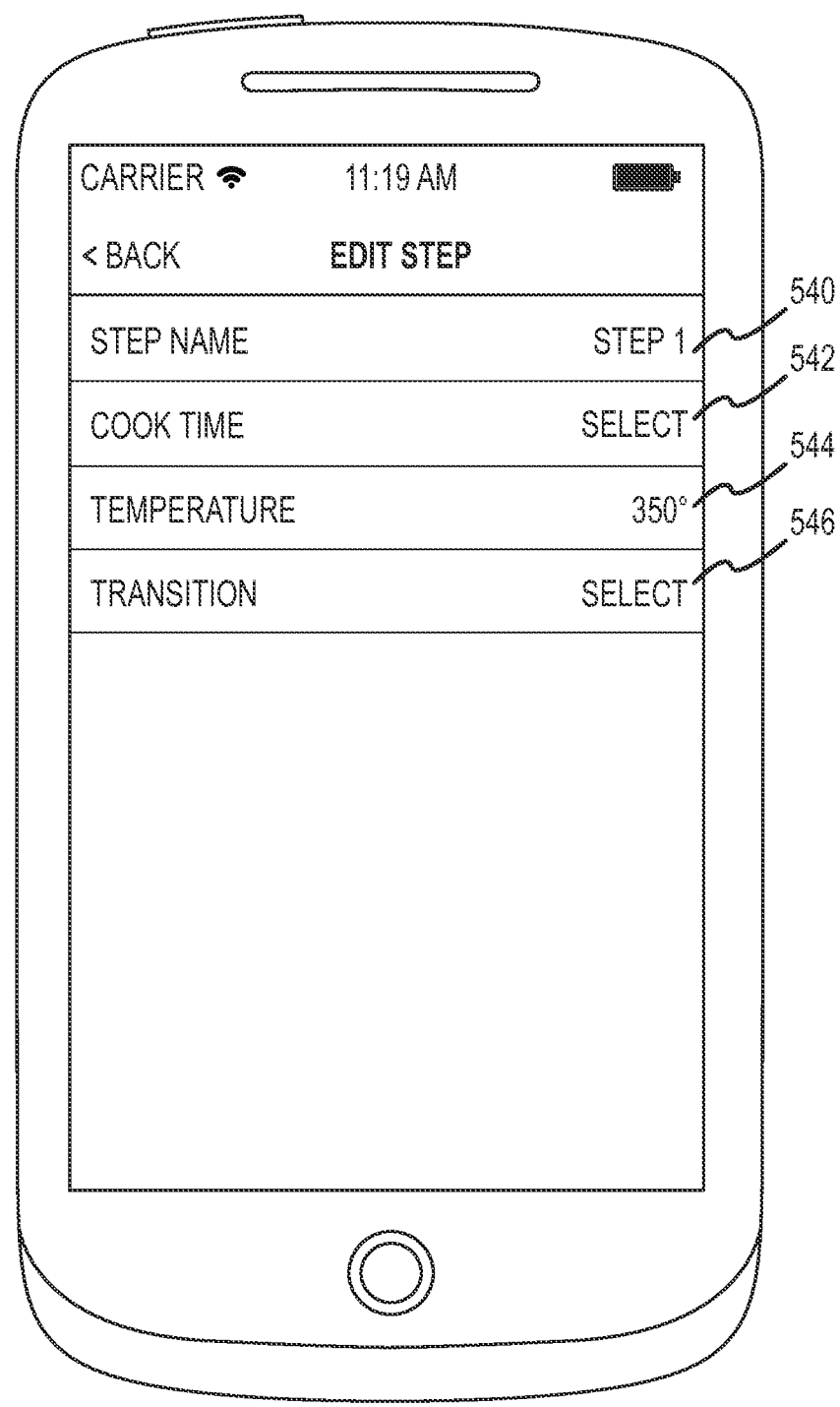
FIG. 4D illustrates an example interface for editing a particular step of a recipe according to aspects of the present disclosure.

FIG. 4D illustrates an example interface for editing a particular step of a recipe. The user can customize, through this interface, the step name 540, the cook time 542, the temperature 544, and the transition 546. The mobile device can store each of the steps, including the step name 540, the cook time 542, the temperature 544, and the transition 546, if any, in memory of the mobile device, and communicate a recipe including the steps to the grill 100, another mobile device, or a server. Although the example interface of FIG. 4D may correspond to the mobile device 500, the user may edit the recipe through a similar interface on the grill 100 or another computing device. In addition, the user may edit the recipe through voice commands through the grill 100, mobile device 500, and/or another computing device. For example, the user may say "Add <CookTime>", wherein CookTime may be 30 seconds or another time which may be added to the cook time 542. Any recipe parameter, including the name 540, the cook time 542, the temperature 544, the transition 546, and which burners 101 to control, may be edited through the interface and/or voice commands.

Referring back to FIG. 4A, once the recipe is initiated, the Chef is created (408). In some aspects, the Chef is a representation of the session where the steps of the recipe are executed. The Chef can be created and executed by the control system 150. The Chef state is changed to PREP (410). The PREP process is performed (412). In the PREP process, the grill 100 ignites, stabilizes, and maintains a burner temperature according to the first step of the recipe, for each assigned burner 101. There can be more than one burner 101, each having a different temperature specified by the recipe. A recipe can control one burner over time, and a recipe can be executed on more than one burner to accommodate the space required for the food to be cooked. A recipe can be executed to use all burners, or to use fewer than all burners. Once each of the burners 101 has achieved the target temperature according to the recipe, the PREP process is complete. The control system 150 can determine that a burner has reached the target temperature based on a signal received from a grate or burner temperature probe associated with the burner.

After the PREP process is complete, the Chef enters a TRANSITION state (414). Transitions occur between each step of the recipe. The transitions require user interaction before the recipe can continue cooking. The grill 100 can prompt the user to execute a transition (416). For example, the grill 100 can send a signal to the application operating on the mobile device 500 to produce a notice associated with the first step (418). For example, the mobile device 500 can display the step on the screen of the mobile device 500. The mobile device 500 can play an audible command through the speaker of the mobile device 500. The grill 100 can prompt the user to execute the transition by playing an audible command through the speaker 118 of the grill 100 (420).

Figure 4E:
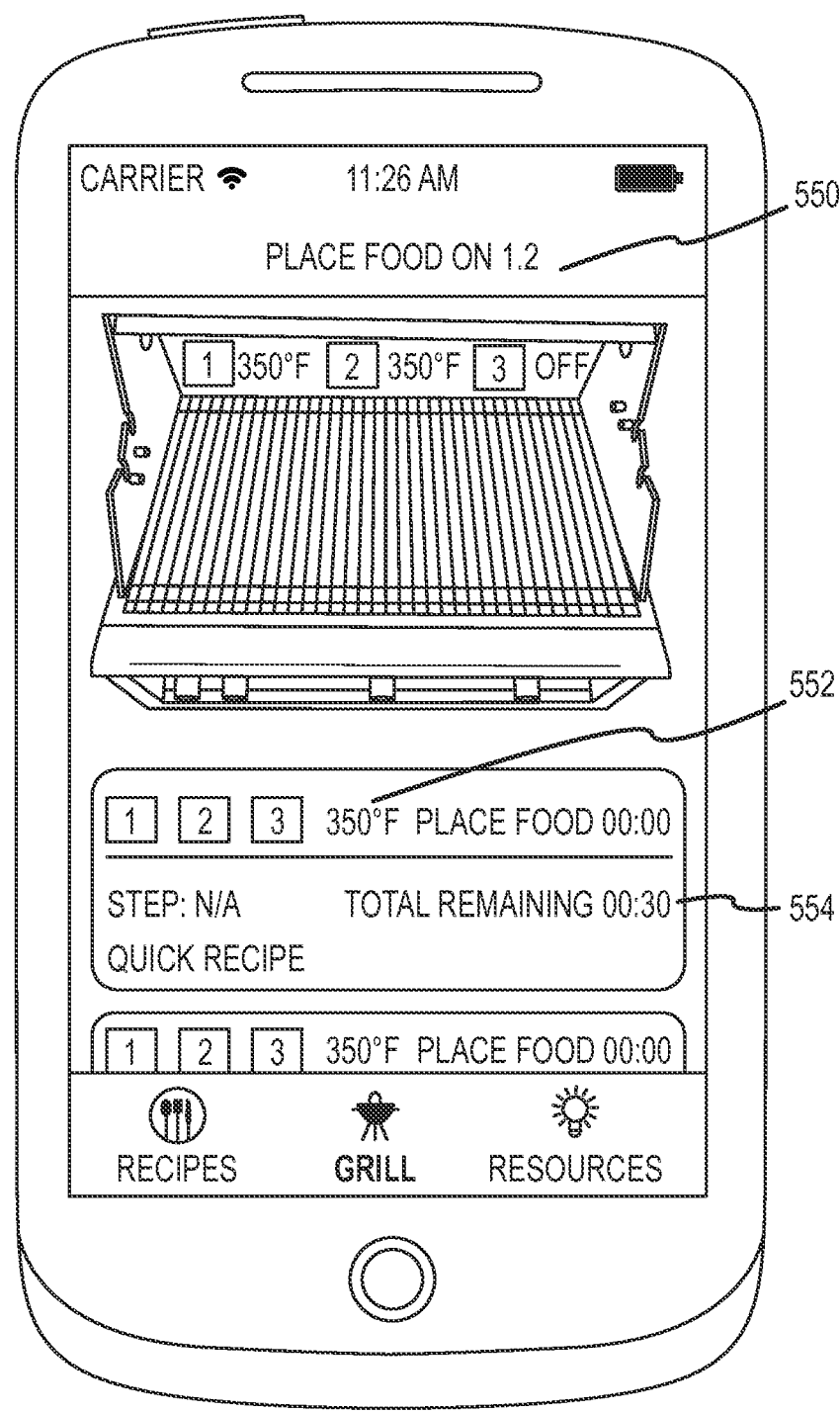
FIG. 4E illustrates an example status of recipe during execution according to aspects of the present disclosure.

FIG. 4E illustrates an example recipe status during execution. The recipe status of FIG. 4E displays the step name 550 of the step currently being performed, the temperature of the step 552, and the time 554.

Referring back to FIG. 4A, once the transition prompt has been produced, the user can give an indication that the transition was performed (424). The user can give an indication that the transition was performed by entering the indication in the app operating on the mobile device 500 (426). For example, an interface (e.g., a pop-up) can appear on the mobile device 500, generated by the application, and the user can give the indication that the transition was performed by clicking on a corresponding button. The mobile device can receive the indication that the transition was performed and communicate to the control system 150 an indicator that performance of the transition was received. An indication that the transition was performed can be given by the user giving a voice command to the grill 100, via the microphone 120 (428), and received and processed by the control system 150.

Figure 4F:
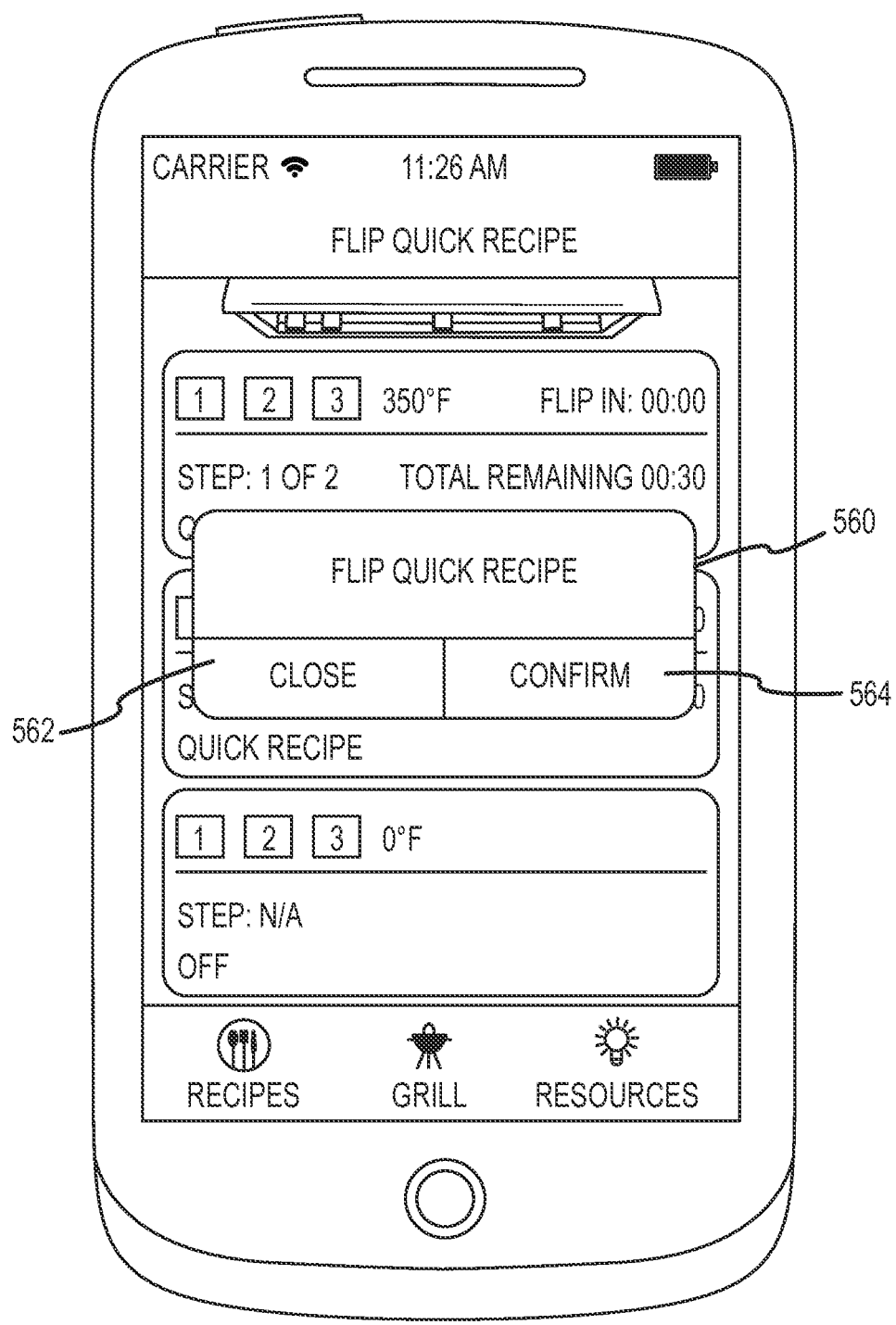
FIG. 4F illustrates an example transition confirmation prompt according to aspects of the present disclosure.

FIG. 4F illustrates an example transition confirmation prompt or command for action 560. The transition confirmation prompt includes a close button 562. In some aspects selecting the close button indicates to the application that the transition has not been performed, and to have the transition confirmation prompt appear at a later time. In some aspects, selecting the close button indicates to the application that the recipe should be cancelled. The transition confirmation prompt also includes a confirm button 564. In some aspects, selecting the confirm button indicates to the application that the transition was performed.

If the user does not give an indication that the transition was performed, the Prompt Failure to Respond Process can be performed (422). This process is displayed in more detail in FIG. 4G.

Figure 4G:
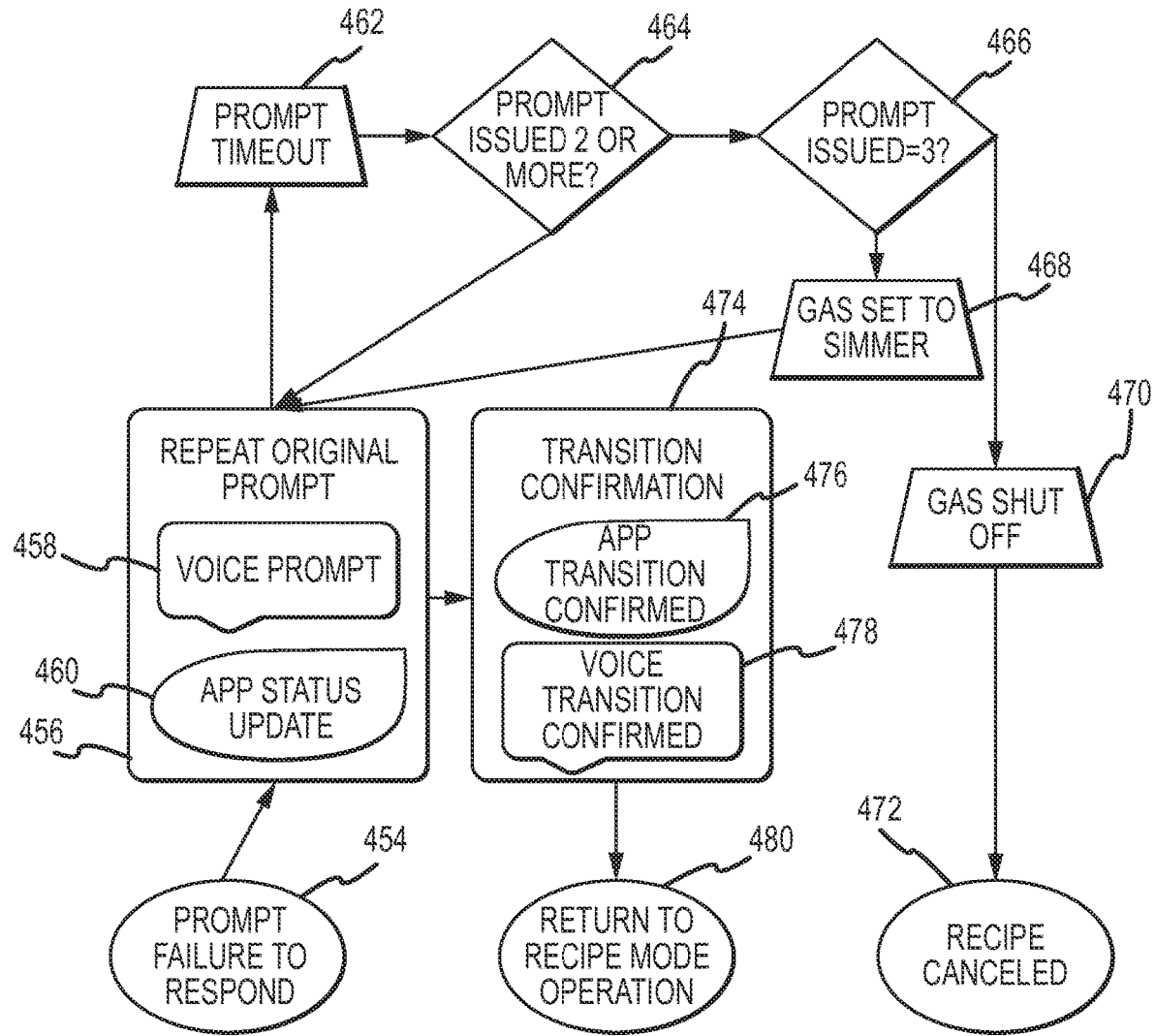
FIG. 4G illustrates an example process for adjusting burners based on a failure to respond by the user according to aspects of the present disclosure.

FIG. 4G illustrates an example process for adjusting burners based on a failure to respond by the user. Some or all of this process can be executed by the control system 150, and instructions for this process can be stored in the memory 114. If after a period of time, the user does not give an indication that the transition was performed, the transition prompt can be produced again (456). As discussed above, the transition prompt can be a voice prompt from the grill 100 (458) or a notification on an application of the mobile device 500 (460). For example, the control system 150 can deliver a voice prompt through the speaker 118, send an instruction to the mobile device 500 to deliver a notification, or both. A timer can be started by either or both of the control system 150 and the mobile device 500. If neither the mobile device 500 nor the control system 150 receives an indication from the user that the transition was performed before the timer reaches a threshold value (462), and fewer than two reminder prompts have been issued (464), the process repeats the prompt (456). The timer is started again and if the user does not give an indication that the transition was performed before the timer reaches the threshold value (462) the reminder prompt count is checked (464). If the count is two (466), the gas flow level is adjusted to a lower level (468), thereby lowering the temperature at the grates 103. The lower level can be a predetermined extent of opening of the valve 122 or a predetermined burner or grate temperature. When the lower level is a predetermined burner or grate temperature, the control system 150 can control the valve 122 to progressively close the valve 122 until the control system detects based on a signal from the corresponding probe that the temperature at the burner or the grate has reached the predetermined temperature. The prompt is repeated (456), the timer is started again, and if the user does not give an indication that the transition was performed before the timer reaches the threshold value (462), the reminder prompt count is checked (464, 466). If the reminder check count is equal to three, the gas to the grill 100 is shut off (470) and the recipe is cancelled (472). Before the third reminder prompt, the user can give an indication, received by the control system 150 or the mobile device 500, that the transition has been performed (474), as discussed above. In some implementations, the duration of the timer between each prompt can be the same what in others the timer durations can differ between the prompts.

Returning to FIG. 4A, after the control system 150 or the mobile device 500 has received an indication given by the user that the transition has been performed, the system determines whether the transition that was just performed was the final step in the recipe (430). If the step is not the last step, the Chef enters the COOK state (432).

In the COOK state, the burners 101 are brought to and maintained at the cook temperature associated with the particular step in the recipe (434) until a timer expires (436). The control system 150 can control the valve 122 to progressively open or close the valve 122 until the control system detects based on a signal from the grate temperature probe that the temperature at the grate has reached the temperature associated with the step, or a range of temperatures that includes the temperature associated with the step. The timer is set to measure the time corresponding to the cook time associated with the particular step in the recipe.

After the cook time has elapsed, the Chef enters the TRANSITION state (414) and the process 416-430 is repeated again. If the final step of the recipe has been completed, the burners 101 are shut down (438) and the recipe execution is complete (440).

From any Chef state (e.g., PREP, TRANSITION, or COOK), the recipe can be aborted (444). The recipe can be aborted by receiving a command from the application operated by the mobile device (446). For example, the user can click on a cancel button from the user interface of the application. In response to the cancel button being clicked, the burners can turn off. Alternatively, the burners can remain on with the same heat intensity or can remain on, but can be adjusted to a lower heat intensity. The recipe can be aborted by a voice command to cancel the recipe received at the grill 100 via the microphone 120 (448). In response to receiving the voice command to cancel the recipe, the control system 150 can turn off the associated burners. Alternatively, the burners can remain on with the same heat intensity or can remain on, but can be adjusted to a lower heat intensity. The recipe can be aborted by a manual knob turn-off event (450). For example, the user can manually turn off a burner 101 by adjusting the corresponding knob to the extent that the burner is turned off. Accordingly, the recipe is aborted. The recipe can be aborted by a system shutdown (452). For example, the power on/off button can be turned off during a recipe's execution, resulting in aborting the recipe.

Cooking preferences can be adjusted for a given recipe. Upon retrieval of a recipe, the system can prompt the user to specify a number of cooking zones to use for the recipe. The recipe can have a previously set value for the number of cooking zones, but selection by the user of a different value overrides the previously set value for the number of cooking zones. The new adjusted value can be saved. Further, a cooking preference can be specified by the user in order to adjust cooking time. The user can instruct the system to perform the recipe as specified in the recipe. The user can instruct the system to modify the time to increase or decrease the cooking time. For example, the user can press buttons on the mobile device 500 to indicate adding or subtracting time increments to or from the standard recipe. The user can also speak the modification. For example, the user can say "add one minute" or "reduce by two minutes." The system can save this modification. The user can instruct the system to perform the recipe in the same manner as performed last.

Figure 5:
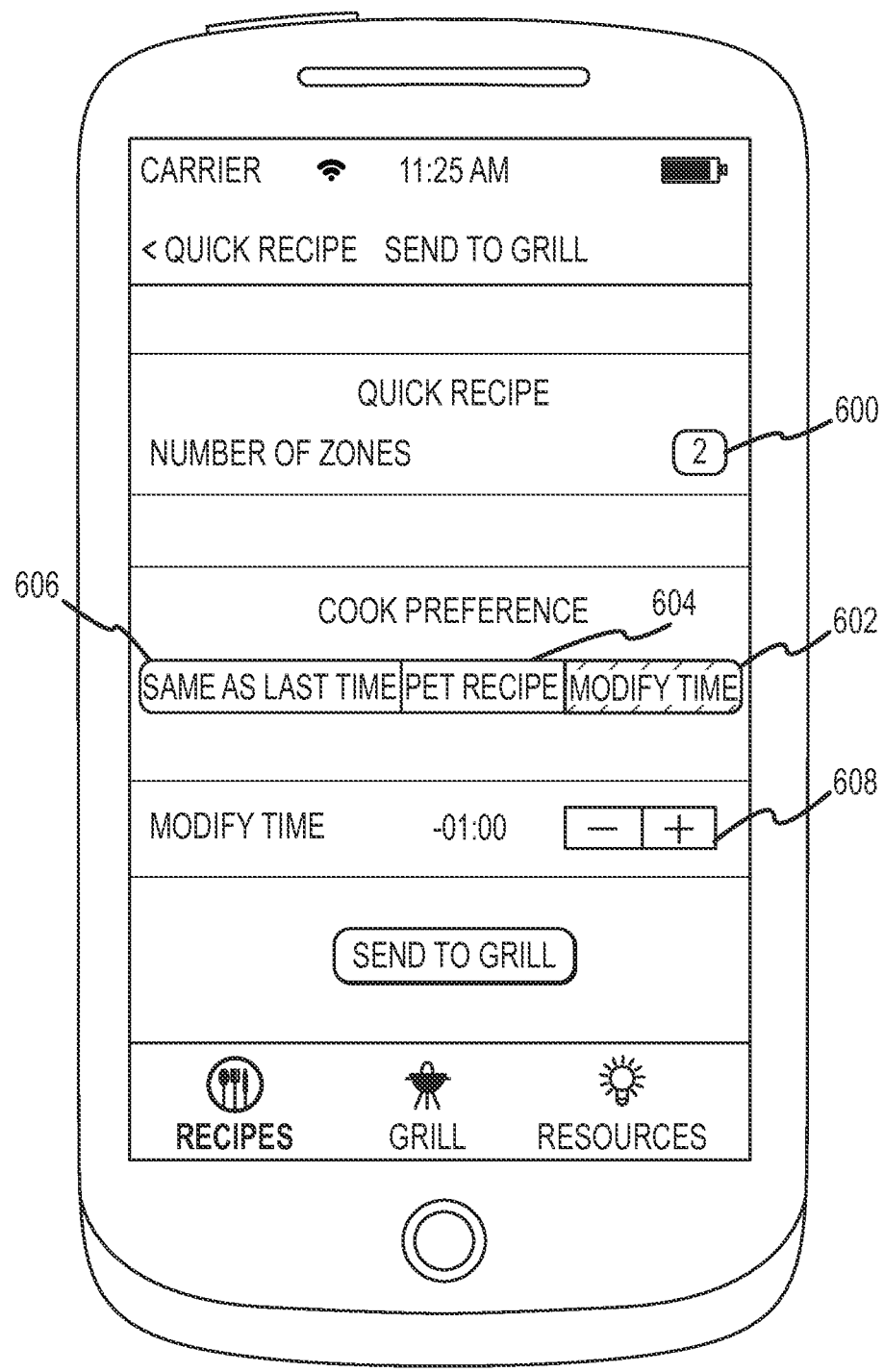
FIG. 5 illustrates an example interface for adjusting parameters of a recipe using an application on a mobile device according to aspects of the present disclosure.

FIG. 5 illustrates an example interface for adjusting parameters of a recipe using an application on the mobile device 500. The user can specify the number of zones in field 600. The user can indicate modification of the recipe cooking time by selecting button 602 and adjusting the time using adjusting buttons 608. The user can initiate execution of the recipe according to the recipe by selecting button 604. The user can indicate execution of the recipe using a modification most recently made by selecting button 606.

Figure 6:
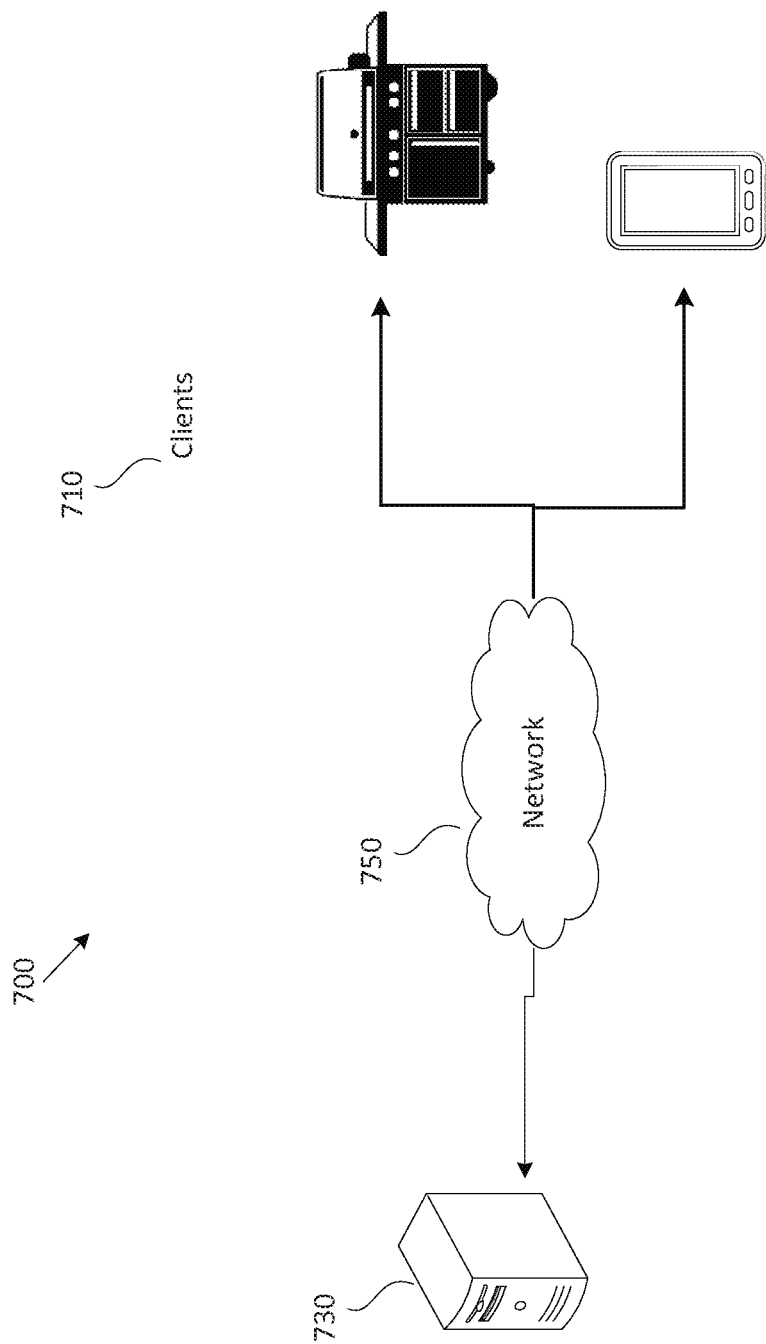
FIG. 6 illustrates an example network environment in which some implementations of a grill according to the subject technology is operated according to aspects of the present disclosure.

FIG. 6 illustrates an example architecture 700 for operation of a computer-controlled grill. The architecture 700 includes server 730 and clients 710 connected over a network 750.

Each of the many clients 710 is configured to connect to the network 750. The clients 710 can be, for example, desktop computers, mobile computers, tablet computers (e.g., including e-book readers), mobile devices (e.g., a smartphone or PDA), set top boxes (e.g., a television), video game consoles, or any other devices having appropriate processor, memory, and communications capabilities for connecting to the network 750.

The server 730 can be any device having an appropriate processor, memory, and communications capability for facilitating communications between devices 710. The network 750 can include, for example, any one or more of a personal area network (PAN), a local area network (LAN), a campus area network (CAN), a metropolitan area network (MAN), a wide area network (WAN), a broadband network (BBN), the Internet, and the like. Further, the network 750 can include, but is not limited to, any one or more of the following network topologies, including a bus network, a star network, a ring network, a mesh network, a star-bus network, tree or hierarchical network, and the like.

In some aspects, the clients 710 can be directly connected to each other in a peer to peer connection. For example, the clients 710 can be connected by Bluetooth.

Figure 7:
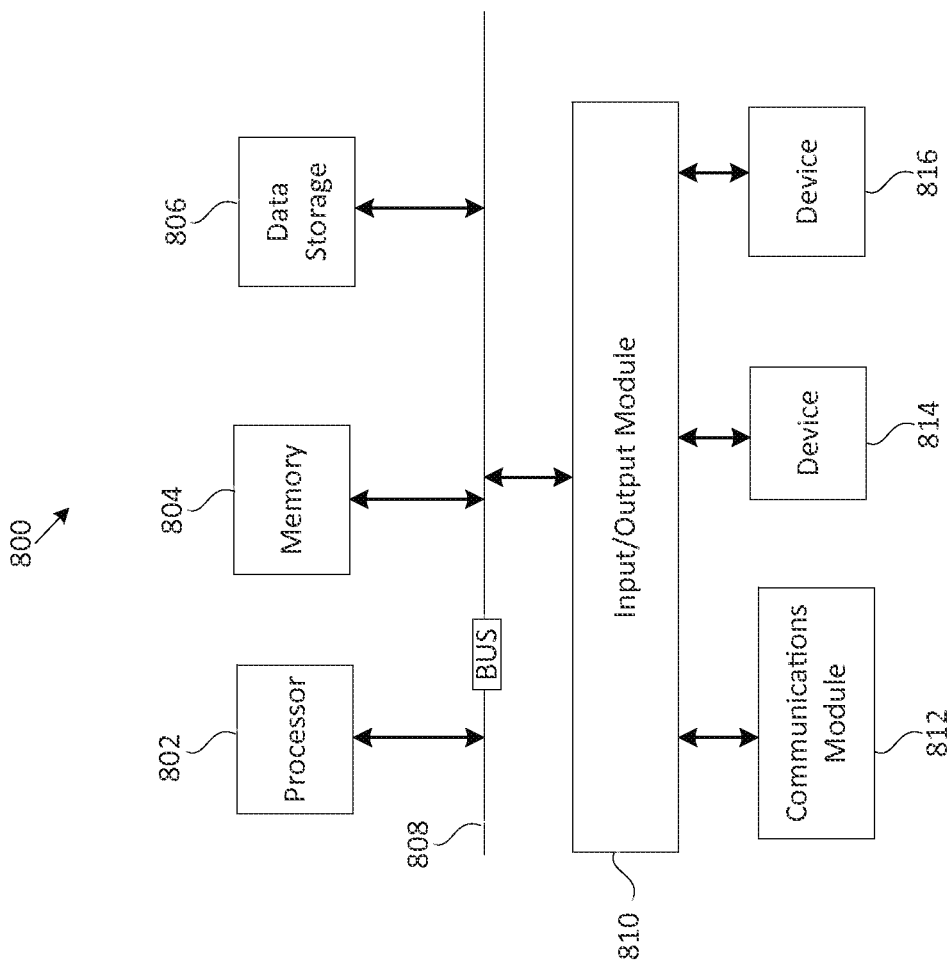
FIG. 7 illustrates an example electronic system with which some implementations of the subject technology may be implemented according to aspects of the present disclosure.

FIG. 7 is a block diagram illustrating an example computer system 800 with which some implementations of the subject technology can be implemented. In certain aspects, the computer system 800 can be implemented using hardware or a combination of software and hardware, either in a dedicated server, or integrated into another entity, or distributed across multiple entities.

Computer system 800 includes a bus 808 or other communication mechanism for communicating information, and a processor 802 coupled with bus 808 for processing information. By way of example, the computer system 800 can be implemented with one or more processors 802. Processor 802 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions can be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions can also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 804 can also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk, optical disk, or non-transitory solid-state memory (e.g., flash memory), coupled to bus 808 for storing information and instructions. Computer system 800 can be coupled via input/output module 810 to various devices. The input/output module 810 can be any input/output module. Example input/output modules 810 include data ports such as USB ports. The input/output module 810 is configured to connect to a communications module 812. Example communications modules 812 include networking interface cards, such as Ethernet cards and modems. In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode) array surrounding a knob, CRT (cathode ray tube), or LCD (liquid crystal display) screen, for displaying information to the user.

According to one aspect of the present disclosure, the client 710 and server 730 can be implemented using a computer system 800 in response to processor 802 executing one or more sequences of one or more instructions contained in memory 804. Such instructions can be read into memory 804 from another machine-readable medium, such as data storage device 806. Execution of the sequences of instructions contained in main memory 804 causes processor 802 to perform the process steps described herein. One or more processors in a multi-processing arrangement can also be employed to execute the sequences of instructions contained in memory 804. In alternative aspects, hard-wired circuitry can be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium can take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Figure 8:
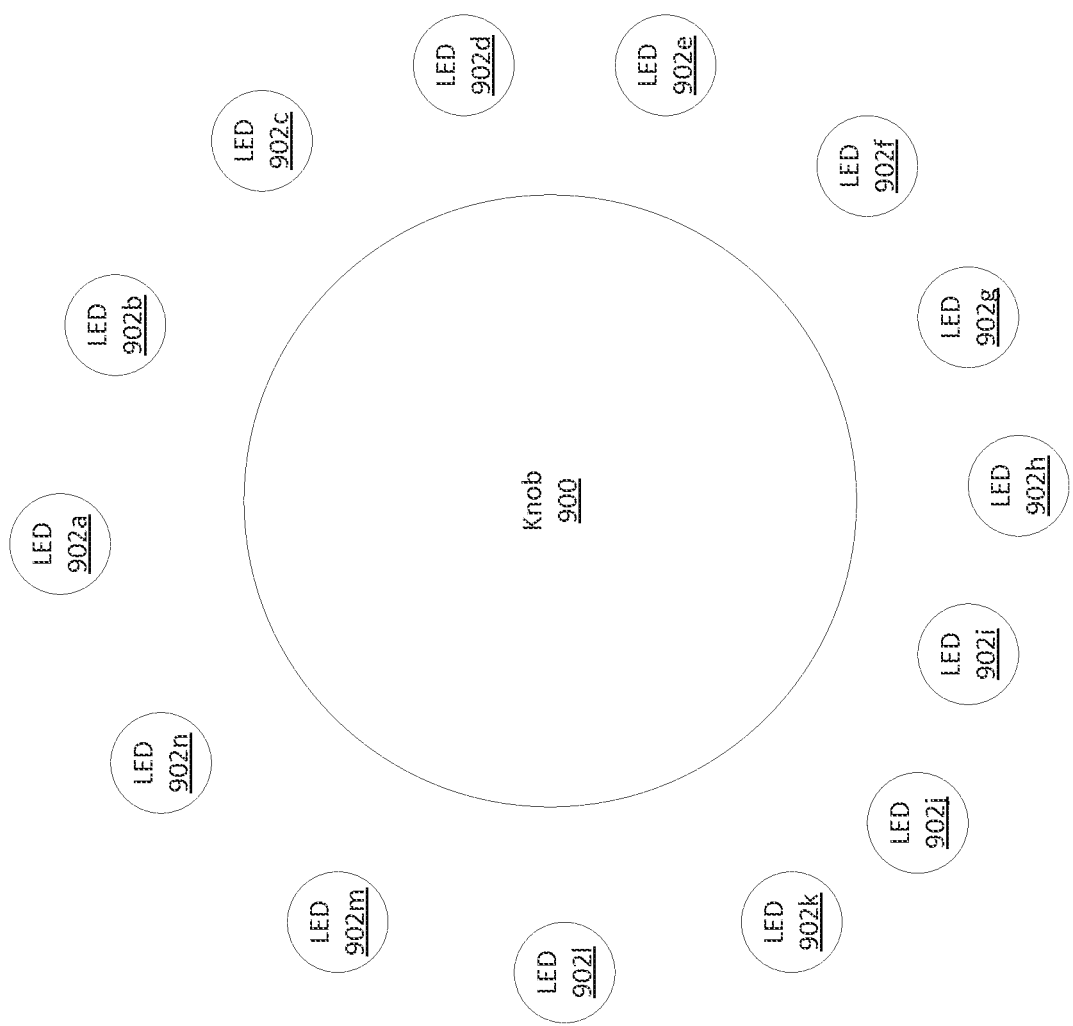
FIG. 8 illustrates an example knob with surrounding LED lights according to aspects of the present disclosure.

FIG. 8 illustrates an example array of LEDs 902a-902n surrounding a knob 900 of the grill 100. A knob 900 and LED array 902a-902n can be located directly in front of each burner 101 position indicating the burner 101 associated with the knob 900. The grill 100 can have any number of knobs 900 and burners 101. In one aspect, the grill 100 has 3 to 6 knobs/burners.

The LEDs 902a-902n can increase and decrease in illumination radially around the knob 900 as an indication of gas flow or target temperature. In some aspects, the illumination of the LEDs 902a-902n can increase and decrease gradually. In some aspects, the LEDs 902a-902n can be illuminated or not illuminated. This can occur in both manual and automatic mode. The LEDs can illuminate in this manner for knobs with burners 101 having gas flow. In addition to indicating the intensity of the burner 101, the LEDs 902a-902n of all knobs 900 can flash on full whenever the grill 100 is communicating verbally. That is, the LEDs 902a-902n can be fully illuminated when sound is being emitted from speaker 118 from the grill 100. In some aspects, the LEDs 902a-902n can increase and decrease in illumination based on the sound emitted from speaker 118 from the grill 100. The LEDs 902a-902n at each knob 900 can flash at each transition period for a particular recipe and burner 101. This can indicate which burner 101 needs attention for action by the user (e.g., flipping a steak).

Grill 100 can include, in addition to hardware, code that creates an execution environment for the computer program in question, e.g., code that constitutes processor firmware, a protocol stack, a database management system, an operating system, or a combination of one or more of them stored in an included memory 114, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to a bus for storing information and instructions to be executed by processor 112. The processor 112 and the memory 114 can be supplemented by, or incorporated in, special purpose logic circuitry.

Grill 100 can include a data storage device such as a magnetic disk or optical disk, coupled to a bus for storing information and instructions. Example communications modules 116 include networking interface cards, such as Ethernet cards and modems.

According to one aspect of the present disclosure, processor 112 can execute one or more sequences of one or more instructions contained in memory 114. Such instructions can be read into memory 114 from another machine-readable medium, such as a data storage device. Execution of the sequences of instructions contained in main memory 114 causes processor 112 to perform the process steps described herein. One or more processors in a multi-processing arrangement can also be employed to execute the sequences of instructions contained in memory 114. In alternative aspects, hard-wired circuitry can be used in place of or in combination with software instructions to implement various aspects of the present disclosure. Thus, aspects of the present disclosure are not limited to any specific combination of hardware circuitry and software.

The grill 100, mobile device, and server can be interconnected by any form or medium of digital data communication, e.g., a communication network. The communication network (e.g., network 750) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The modules can be hardware or software modules.

Although various aspects, features, and exemplifying embodiments of the subject technology have been described with reference to grills, the subject technology also can be practiced with other cooking appliances, such as ovens and stoves for example, in the place of the referenced grills.

The term "machine-readable storage medium" or "computer readable medium" as used herein refers to any medium or media that participates in providing instructions or data to processor 112 for execution. Such a medium can take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

While this specification contains many specifics, these should not be construed as limitations on the scope of what may be disclosed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially disclosed as such, one or more features from a disclosed combination can in some cases be excised from the combination, and the disclosed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following disclosure. For example, the actions recited in the disclosure can be performed in a different order and still achieve desirable results. As one example, the processes depicted in the accompanying figures do not necessarily require the particular order shown, or sequential order, to achieve desirable results. In certain implementations, multitasking and parallel processing can be advantageous. Other variations are within the scope of the disclosure.

In one aspect, any methods, instructions, code, means, logic, components, blocks, modules and the like (e.g., software or hardware) described or recited in the clauses herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions are explicitly represented in drawings, but any of the clauses/descriptions can be represented in drawings in a manner similar to those drawings explicitly shown. For example, a flow chart can be drawn for any of the clauses or sentences for a method such that each operation or step is connected to the next operation or step by an arrow. In another example, a block diagram can be drawn for any of the clauses or sentences having means-for elements (e.g., means for performing an action) such that each means-for element can be represented as a module for element (e.g., a module for performing an action).

What is claimed is:

1. A system for operating a grill, the system comprising:
   one or more grate temperature sensors;
   one or more network interfaces configured to communicate via a network with a mobile device executing an application;
   one or more processing devices; and
   one or more memory devices storing instructions that, when executed by the one or more processing devices, cause the one or more processing devices to execute the instructions, wherein the instructions comprise:
   receiving, from the mobile device via the network, a command to retrieve a recipe;
   retrieving the recipe from at least one of a non-transitory computer-readable medium, a network location, or the mobile station, the recipe comprising a plurality of steps, one or more step cook times, one or more grate temperatures, and one or more prompts configured to be provided to a user instructing the user to perform at least one step of the plurality of steps, wherein at least one of the one or more prompts comprises a prompt instructing the user to flip a food item on the grill;
   beginning to execute the plurality of steps of the recipe;
   communicating with the mobile device to cause the application of the mobile device to output the prompt instructing the user to flip the food item on the grill on the mobile device and to output a confirmation prompt requesting a confirmation from the user that the user has completed flipping the food item on the grill;
   controlling a gas control valve to reduce gas flow to one or more burners thereby lowering a grate temperature of the grill to a reduced temperature the confirmation from the user that the user has completed flipping the food item on the grill is not received from the mobile device within a first threshold period of time;
   controlling the gas control valve to control the gas flow to the one or more burners to change the temperature from the reduced temperature to a set temperature associated with a next step of the recipe following the at least one step of the recipe when the confirmation from the user that the user has completed flipping the food item on the grill is received from the mobile device within a second threshold period of time, the second threshold period of time terminating after the first threshold period of time; and controlling the gas control valve to terminate the gas flow to the one or more burners when the confirmation from the user that the user has completed flipping the food item on the grill is not received from the mobile device within the second threshold period of time.

2. The system of claim 1, wherein the instructions further comprise: receiving, from the mobile device via the network, the confirmation from the user that the user has completed flipping the food item on the grill.

3. The system of claim 1, wherein the instructions further comprise producing a notice when the grill has attained an initial grate temperature specified by the recipe, as measured by the one or more grate temperature sensors.

4. The system of claim 1, wherein the instructions further comprise:
receiving, via an audio input, one or more commands to control an operation of the grill.

5. The system of claim 1, wherein the instructions further comprise: causing the mobile device to produce a notice requesting an input from the user confirming or modifying at least one step cook time; receiving, from the mobile device, the input from the user;
updating the at least one step cook time based on the input when the input corresponds to a modification of the at least one step cook time; and
producing a second prompt to the user instructing the user to perform an action based on the updated cooking time.

6. The system of claim 1, wherein the instructions further comprise: monitoring a temperature of a burner of the grill with the one or more grate temperature sensors;

upon detecting that the temperature of the burner is below a threshold temperature, controlling the gas control valve to increase the gas flow through to the burner, and activating a grill ignition associated with the burner; and upon detecting that the temperature of the burner of the grill remains below the threshold temperature after a predetermined period of time, controlling the gas control valve to turn off gas flow into the burner and deactivating the grill ignition associated with the burner.

7. The system of claim 6, wherein activating the grill ignition comprises: confirming a proper activation of the igniter by detecting a current from a flame sensor satisfying a threshold current;
opening the gas control valve; and
detecting an increase in the temperature of the burner.

8. The system of claim 6, wherein the instructions further comprise: maintaining the gas flow until a low temperature threshold is exceeded; and decreasing the gas flow based on the recipe.

9. The system of claim 1, wherein the set temperature associated with the next step of the recipe following the at least one step of the recipe is different from a set temperature of the at least one step of the recipe.

10. The system of claim 1, further comprising at least one light-emitting diode (LED) associated with each of a plurality of burners of the grill, wherein the instructions further comprise providing a visual light indication via the at least one LED associated with the one or more burners associated with the prompt instructing the user to flip a food item on the grill.

* * * * *